(12) United States Patent
Chandler et al.

(10) Patent No.: US 12,090,651 B2
(45) Date of Patent: Sep. 17, 2024

(54) ROBOTIC FARM SYSTEM AND METHOD OF OPERATION

(71) Applicant: Easton Robotics, LLC, Easton, MD (US)

(72) Inventors: Jeff Chandler, Easton, MD (US); Govind Ajith Kumar, Melrose, MA (US); Pradeep Gopal, Norwalk, CT (US)

(73) Assignee: Easton Robotics, LLC, Easton, MD (US)

( * ) Notice: Subject to any disclaimer, the term of this patent is extended or adjusted under 35 U.S.C. 154(b) by 241 days.

(21) Appl. No.: 17/544,428

(22) Filed: Dec. 7, 2021

(65) Prior Publication Data

US 2022/0176544 A1    Jun. 9, 2022

Related U.S. Application Data

(60) Provisional application No. 63/122,080, filed on Dec. 7, 2020.

(51) Int. Cl.
| | |
|---|---|
| *B25J 5/00* | (2006.01) |
| *B25J 9/16* | (2006.01) |
| *B25J 11/00* | (2006.01) |
| *G05D 1/00* | (2006.01) |

(52) U.S. Cl.
CPC .............. *B25J 5/007* (2013.01); *B25J 9/162* (2013.01); *B25J 9/1697* (2013.01); *B25J 11/0055* (2013.01); *G05D 1/0248* (2013.01); *G05D 1/0278* (2013.01)

(58) Field of Classification Search
CPC . B25J 5/007; B25J 9/162; B25J 9/1697; B25J 11/0055; G05D 1/0248; G05D 1/0278; G05D 2201/0201; G05D 1/0246
See application file for complete search history.

(56) References Cited

U.S. PATENT DOCUMENTS

| | | |
|---|---|---|
| 6,671,582 B1 | 12/2003 | Hanley |
| 10,149,468 B2 | 12/2018 | Crinklaw et al. |
| 10,278,324 B2 | 5/2019 | Gerrish |
| 10,295,998 B2 | 5/2019 | Yokoyama |
| 10,595,455 B2 | 3/2020 | Foster et al. |
| 10,747,233 B2 | 8/2020 | Ogura et al. |

(Continued)

FOREIGN PATENT DOCUMENTS

| | | |
|---|---|---|
| DE | 102018108025 A1 | 10/2019 |
| KR | 20190031391 A | 3/2019 |

OTHER PUBLICATIONS

International Search Report dated Mar. 2, 2022, pp. 1-4, for corresponding PCT Application No. PCT/IB2021/061426.

(Continued)

*Primary Examiner* — Sohana Tanju Khayer
(74) *Attorney, Agent, or Firm* — MILES & STOCKBRIDGE P.C.; David R. Schaffer

(57) ABSTRACT

A system including an autonomous ground vehicle ("AGV") designed as a common platform to which is affixed one or more articulated arms, which, when combined with attached implements and software for performing movement of the AGV and the arm(s), carries out tasks common to small farms and maintaining small parcels of land. The software enables a farm operator to set up, control, and monitor operations of the robotic system.

29 Claims, 18 Drawing Sheets

(56) References Cited

U.S. PATENT DOCUMENTS

| | | |
|---|---|---|
| 10,795,351 B2 | 10/2020 | Hurd |
| 2005/0126144 A1 | 6/2005 | Koselka et al. |
| 2008/0319557 A1* | 12/2008 | Summers ............ G05B 19/4015 |
| | | 700/19 |
| 2009/0267312 A1* | 10/2009 | Vaxelaire ................ B60G 3/26 |
| | | 280/5.521 |
| 2015/0045992 A1 | 2/2015 | Ashby et al. |
| 2017/0000027 A1 | 1/2017 | Hunt |
| 2017/0357267 A1 | 12/2017 | Foster et al. |
| 2019/0029178 A1* | 1/2019 | Russel ................... A01D 46/30 |
| 2019/0033158 A1* | 1/2019 | Bonnet ..................... G01L 5/16 |
| 2019/0278269 A1* | 9/2019 | He ......................... A01G 25/09 |
| 2019/0338809 A1 | 11/2019 | Clark et al. |
| 2020/0015408 A1 | 1/2020 | Armstead |
| 2020/0097023 A1* | 3/2020 | Grundey .............. G05D 1/0295 |
| 2020/0193823 A1* | 6/2020 | Zhang ................ G08G 1/09623 |
| 2020/0249669 A1* | 8/2020 | Kosa ...................... A01D 46/30 |
| 2020/0399077 A1* | 12/2020 | Thanu ............... H01L 21/67184 |
| 2021/0001479 A1* | 1/2021 | Raak ......................... B25J 9/102 |
| 2021/0097473 A1* | 4/2021 | Kakaire ......... G06Q 10/063114 |
| 2021/0192420 A1* | 6/2021 | Spielman .................. G06N 5/01 |
| 2022/0388156 A1* | 12/2022 | Hansen ................. B25J 13/085 |

OTHER PUBLICATIONS

Written Opinion of the International Searching Authority dated Mar. 2, 2022, pp. 1-6, for corresponding PCT Application No. PCT/IB2021/061426.

* cited by examiner

ROBOTIC FARM SYSTEM AND METHOD OF OPERATION

TECHNICAL FIELD

This disclosure is related to an automated robotic system designed to carry out specific tasks commonly found in agricultural properties, scaled to the needs of small farms both in size and costs. By extension, the tasks are also commonly found in other real estate property management tasks, including ranches, golf courses, small commercial properties, and large residential properties.

SUMMARY OF THE INVENTION

A system including (i.e., comprising) an autonomous ground vehicle ("AGV") designed as a common platform to which is affixed one or more articulated arms, which when combined with attached implements and software for performing movement of the AGV and the arm(s), carries out tasks common to small farms and maintaining small parcels of land. Software allows a farm operator to set up and monitor operations of the robotic system.

BRIEF DESCRIPTION OF THE DRAWINGS

Non-limiting and non-exhaustive embodiments of the disclosed subject matter are described with reference to the following figures, wherein like reference numerals and/or indicia refer to like parts throughout the various views unless otherwise precisely specified.

In the following drawings, like reference numerals generally indicate identical, functionally similar, and/or structurally similar elements. The left most digits in the corresponding reference numeral indicate the drawing in which an element first appears.

DETAILED DESCRIPTION

In accordance with one or more embodiments of the presently disclosed subject matter, a system for executing tasks common to agriculture and real estate property management, including: an autonomous ground vehicle including a body portion connected to a drive portion, a control portion, and a vision portion and a navigation portion; one or more articulated arms affixed to the body portion of the autonomous ground vehicle; an implement affixed to the end of at least one of the one or more articulated arms or as a complete implement-arm combination; a computerized control module connected to and in communication with the autonomous ground vehicle and including programming, i.e., executable software, to execute movement of the one or more articulated arms, the implement and the autonomous ground vehicle; and a data storage system to record the operations of the system. The system does not preclude the addition of other devices, such as a bucket attached to the top of the vehicle to collect gathered items; a towed wagon attached to a hitch on the rear of the vehicle; or a sprayer tank to accommodate applying fertilizer or herbicide. Neither is it required that any arms at all be used at all to accomplish certain tasks, nor to substitute an articulated arm for different non-articulated arms. More than one autonomous ground vehicle can be made to operate as a coordinated group of vehicles, commonly known as a "swarm" of vehicles.

Figure 1:
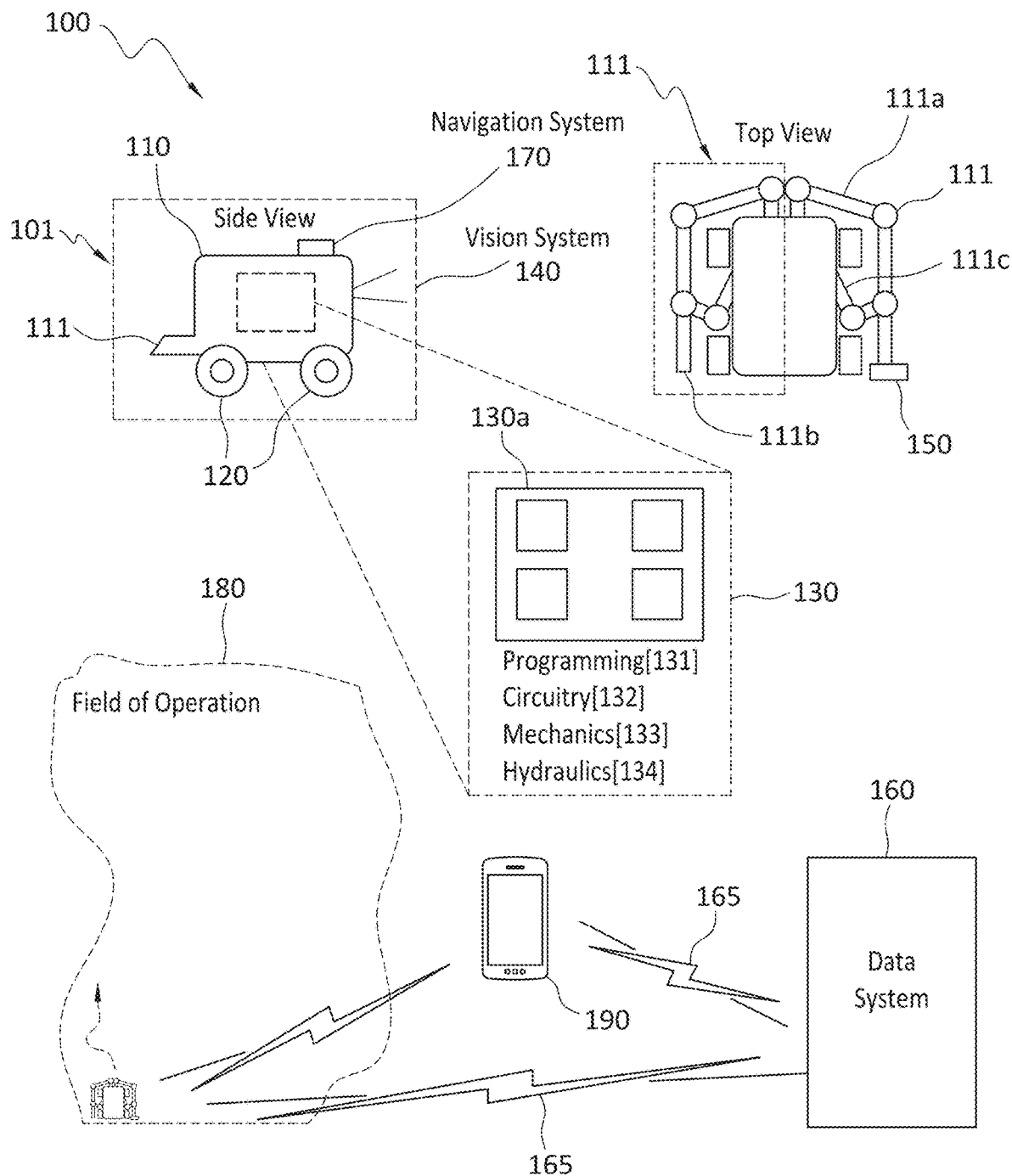
FIG. 1 is a functional block diagram that illustrates multiple major components of a system including an autonomous ground vehicle with one or more articulated arms, a control module, a defined field of operation and a data system for collecting and communicating the operations and parameters between an operator and the autonomous ground vehicle, in accordance with the present disclosure.

FIG. 1 is a functional block diagram that illustrates multiple major components of a system 100 including an autonomous ground vehicle with one or more articulated arms, a control module, a defined field of operation and a data system for collecting and communicating the operations and parameters between an operator and the autonomous ground vehicle, in accordance with one or more embodiments of the presently disclosed subject matter. In FIG. 1, the system 100 includes an autonomous ground vehicle 101 including a body portion 110 connected to a drive portion 120, a control portion 130, and a vision portion 140 and a navigation portion 170. The system 100 further includes one or more articulated arms 111 affixed at one or more proximal ends 111a, 111c to the body portion 110 of the autonomous ground vehicle 101. The one or more articulated arms 111 can be circumferentially spaced around the body portion 110 at adjustable mounting points 111a, 111c randomly or equidistantly from each other along the side of the body portion 110 so as to be used for multiple different tasks such as, for example, but not limited to: planting; weeding; clearing of debris by sweeping or blowing (e.g., but not limited to, leaves and branches); applying fertilizer or herbicides or pesticides using a sprayer and tank; harvesting by cutting, gathering into windrows, or by movement of rollers along the ground (e.g. to gather nuts fallen on the ground); or pruning of plants. Also, the one or more articulated arms 111 can be at different heights on the body portion 110 and each can be separately controlled by the control portion 130 to simultaneously and independently perform different tasks as well as work together in combination to perform the same task(s). This control can either be preprogrammed or operated manually, as well as artificial intelligence (AI) controlled. In addition, each of the one or more articulated arms 111 is configured to interface and connect at a distal end 111b to an implement 150. The implement 150 can include, but is not limited to, a mechanical hand or gripper, a hook or claw, a saw, a knife, a shovel, a rake, a pair of pruning shears, a blower, a sprayer, or a string cutter. The control portion 130 further includes a computerized control module 130a connected to and in communication with the autonomous ground vehicle 101 and including programming 131, for example, but not limited to, executable computer program instructions, circuitry components 132, mechanical components 133, and hydraulic components 134 to execute movement of the one or more articulated arms 111, the implement 150 and the autonomous ground vehicle 101. A data storage system 160 is connected via a communication system 165 to and in communication with the autonomous ground vehicle 101 and configured to define a field of operation 180 in which the autonomous ground vehicle 101 may operate, to record the operations of the system as well as provide data and information necessary for the autonomous ground vehicle 101 to operate and function. This data and information can include, but is not limited to, implement-specific pressure/position/torque requirements, liquid application rates, rate of speed, location, remaining battery life, error information on operations, status information on current progress, and start and stop time. The control and reporting from the data system 160 is accessed via the communication system 165 with a computer 190 including but not limited to a mobile telephone, a tablet computer or personal computer. The computer may be local to the site of operation as well as at a distant location connected through a digital communications network.

Figure 2:
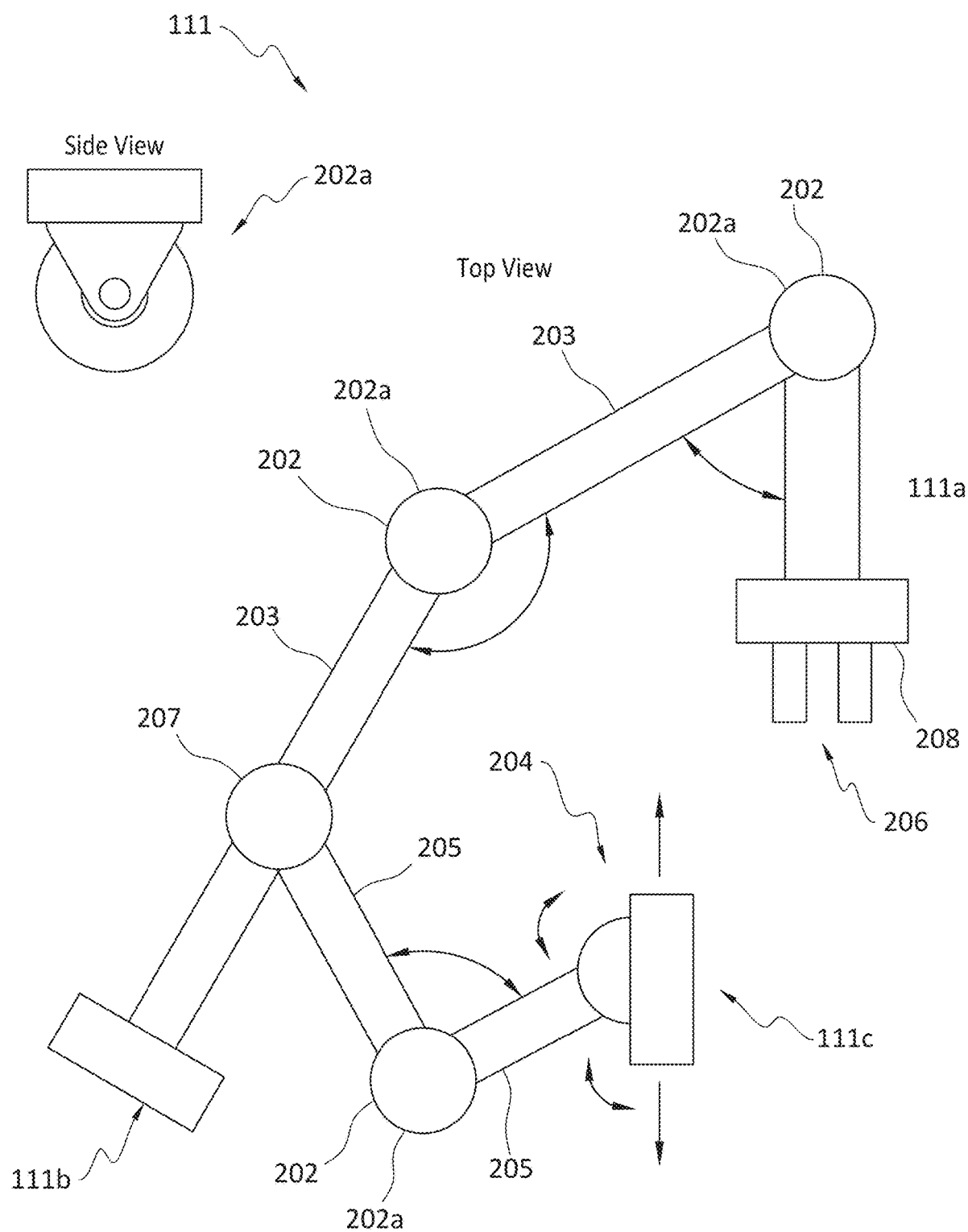
FIG. 2 illustrates an exemplary articulated arm design and its range of motion and attachment points to an autonomous ground vehicle and to an implement, in accordance with the present disclosure.

FIG. 2 illustrates an exemplary articulated arm design and its range of motion and attachment points to an autonomous ground vehicle and to an implement, in accordance with the present disclosure. In FIG. 2, the articulated arm 111 is attaching at the front of vehicle 101 on the proximal end 111a with an electrical power or hydraulic connection 206 and a control sensor connection 208, the arm is comprised of multiple swivel points 202 that each contain an electric or hydraulic motor connecting segments 203 and 205 of the articulated arm 111. The attachment to the side of the body portion 110 includes a swiveling connection 204 for connection 111c. Connection 111c can be located anywhere along the body portion 110 and thus extend or restrict the extent to which the entire arm assembly can extend away from the body portion 110. When the connection 111c is moved to a front corner of the body portion 110 to be closer to the attachment point for proximal end 111a, the entire arm can be extended to make a single continuous arm, whereas if connection 111c is moved away from proximal end 111a and toward the rear of the vehicle 110 side, the arm is highly restricted as to its lateral movement away from the body portion 110. Likewise, in some embodiments, if both the proximal end 111a and connection 111c are attached adjacent to each other on a side of the body portion 110, the articulated arm 111 can extend sideways 30 inches or more plus the length of any implement 150 attached to the distal end 111b. Counter-weighting or ballast can be included in the body portion 110 to improve stability and lessen the likelihood that the autonomous ground vehicle 101 will tip over when one or more of the articulated arms 111 are extended and have a load at their distal ends. In addition, or alternatively to the counter-weighting or ballast, each of the one or more of the articulated arms 111 can include an extendable load stabilizer support 202a, which, when extended away from the autonomous ground vehicle 101, increases the base footprint of the autonomous ground vehicle 101. This is to provide more stability and greater lifting capability when one or more of the articulated arm(s) 111 are at full extension. As seen in the inset side view along line A-A, the extendable load stabilizer support 202a can include a support assembly 202b, which can include a wheel assembly 202b that includes a wheel 202b1 that is rotatable around and connected by an axle 202b2 to a wheel support base 202b3. Although not clearly shown, the wheel support base 202b3 can be rotatably connected to a bottom of the swivel point 202 to permit a continuous 360° rotation. In addition, although not specifically shown, the wheel assembly 202b can include a locking mechanism to prevent the wheel 202b1 and/or the wheel support base 202b3 from moving. In other embodiments, the support assembly 202b can alternatively be implemented using, but is not limited to, a roller ball assembly and/or a rigid support assembly. If there are two arms 111 on each side, i.e., opposite sides, of the body portion 110, they can extend outwardly from the body portion 110 in total 60 inches or more, disregarding any implements. Thus, the range of movement gives great flexibility to the types of implements that may be used and the reach. Furthermore, when the vehicle 101 is driven in reverse, the articulated arms 111 can be used with implements 150 that require a following movement rather than a forward movement of the vehicle 101.

In other embodiments of the presently disclosed subject matter, the autonomous ground vehicle 101 can have sets of articulated arms 111, for example, a first set in the front of the autonomous ground vehicle 101 and a second set in the back of the autonomous ground vehicle 101. With multiple sets of articulated arms 111, it may be necessary to have additional vision 140 and navigation 170 portions, as well as additional programming and control logic, circuitry, and hydraulics to enable the full and independent operation of each set of articulated arms 111. Likewise, in other embodiments of the presently disclosed matter, the autonomous ground vehicle 101 can have arms that are fixed in their positions.

Figure 3:
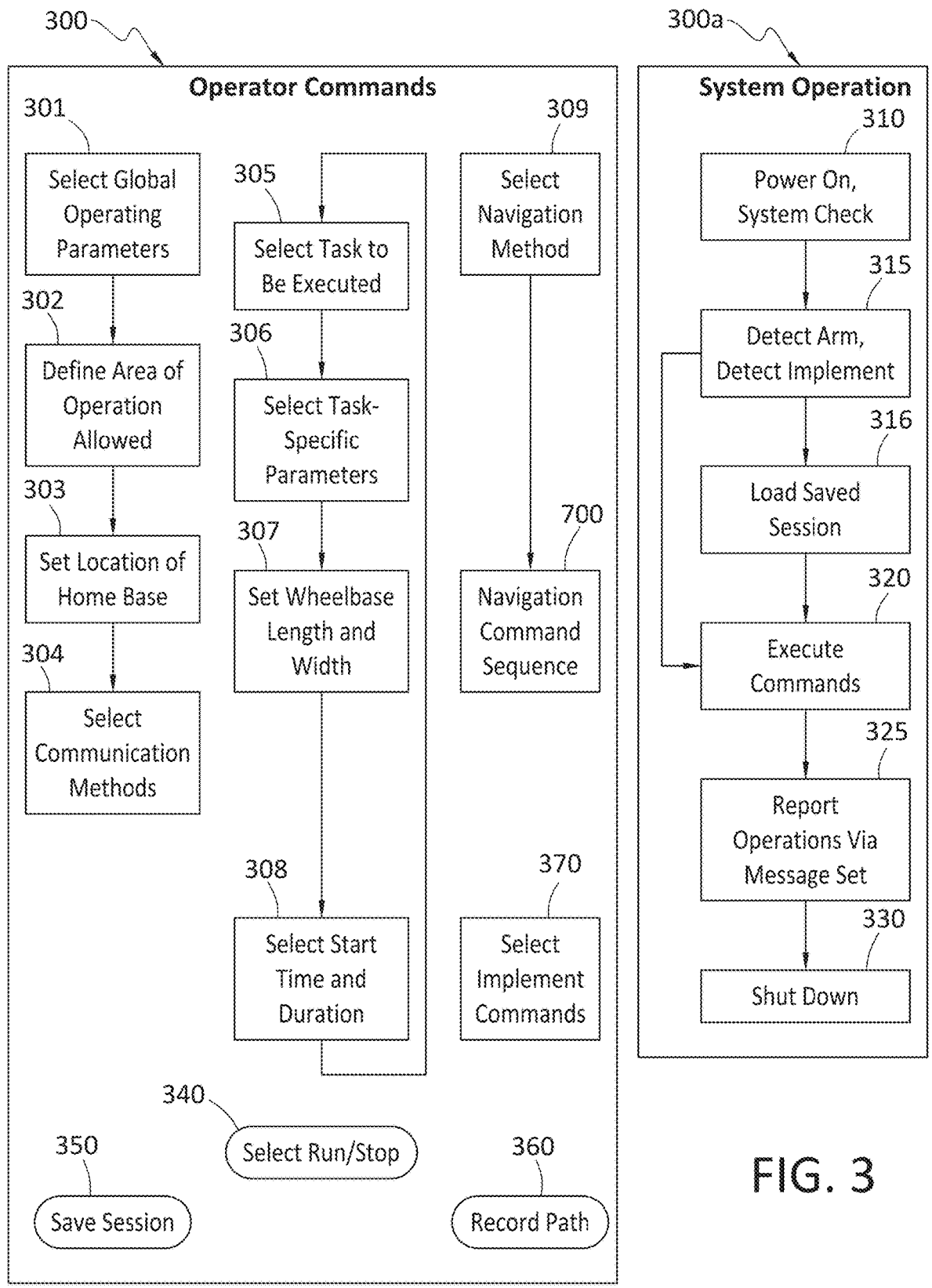
FIG. 3 illustrates an exemplary block diagram of a flow of commands given by a human operator and the system operations performed by an autonomous ground vehicle, in accordance with the present disclosure.

FIG. 3 illustrates an exemplary block diagram of a flow of commands given by a human operator and the system operations performed by an autonomous ground vehicle 101, in accordance with an exemplary embodiment of the disclosed subject matter. In FIG. 3, a method of operation 300 includes a sequence of system operations 300a to be executed by the autonomous ground vehicle 101 during operation of the system 100 and includes powering on and performing 310 an automatic system check of the system 100. Once the powering on and performing 310 of the automatic system check is complete, the system detects 315 how many articulated arms 111 and which, if any, implements 150 are attached to each articulated arm 111. The method loads into memory any previously recorded sessions 316 to be executed, if any. The method then executes 320 any commands that have been received and/or stored in the system 100. Following the execution 320 of each command, the system reports 325 the operations and results to the data system 160. At the end of all commands, the autonomous ground vehicle shuts down 330

As to the operator of the autonomous vehicle 101, in FIG. 3, in defining the commands 300 for the sequence of system operations 300a, the operator selects 301 a series of variables, but not necessarily in any required sequence, to set global operating parameters (for example, but not limited to, time of day and day of week allowed for operation,) then, but not necessarily in any required sequence, defines 302 the field of operation allowed by outlining the physical area using a map overlay or using X-Y coordinates or other method, and sets 303 the physical location of a "home base" for the autonomous ground vehicle 101. Next, the operator selects 304, which from among the several communications methods will be used in the sequence of system operations 300a. These selections may be saved 350 as command parameters for future use.

In FIG. 3, in defining the tasks to be performed during the sequence of system operations 300a, the operator creates 305 a set of steps, naming or numbering each step and the type of task to be executed. For the selected task, additional task-specific parameters may be selected 306. For the intended task, the operator may set 307 the wheelbase length and width which, when executed in the sequence of system operations 300a, will cause the respective motors to move as specified. The operator selects 308 the starting time and, where relevant, a duration for operation. These selections may also be saved 350 for future ease of operation. The operator then selects 309 a navigation method for the task step, and a navigation command sequence 700 (best seen in FIG. 7) and related parameters. The operator next selects 370 any implement commands. The operator may choose to record 360 the path of the autonomous ground vehicle 101 during its operations. Lastly, the operator selects 340 whether to run the autonomous ground vehicle 101 or to stop the command definitions. The run/stop option 340 also allows the operator to override all activity of the autonomous ground vehicle 101 causing it to stop completely.

Figure 4:
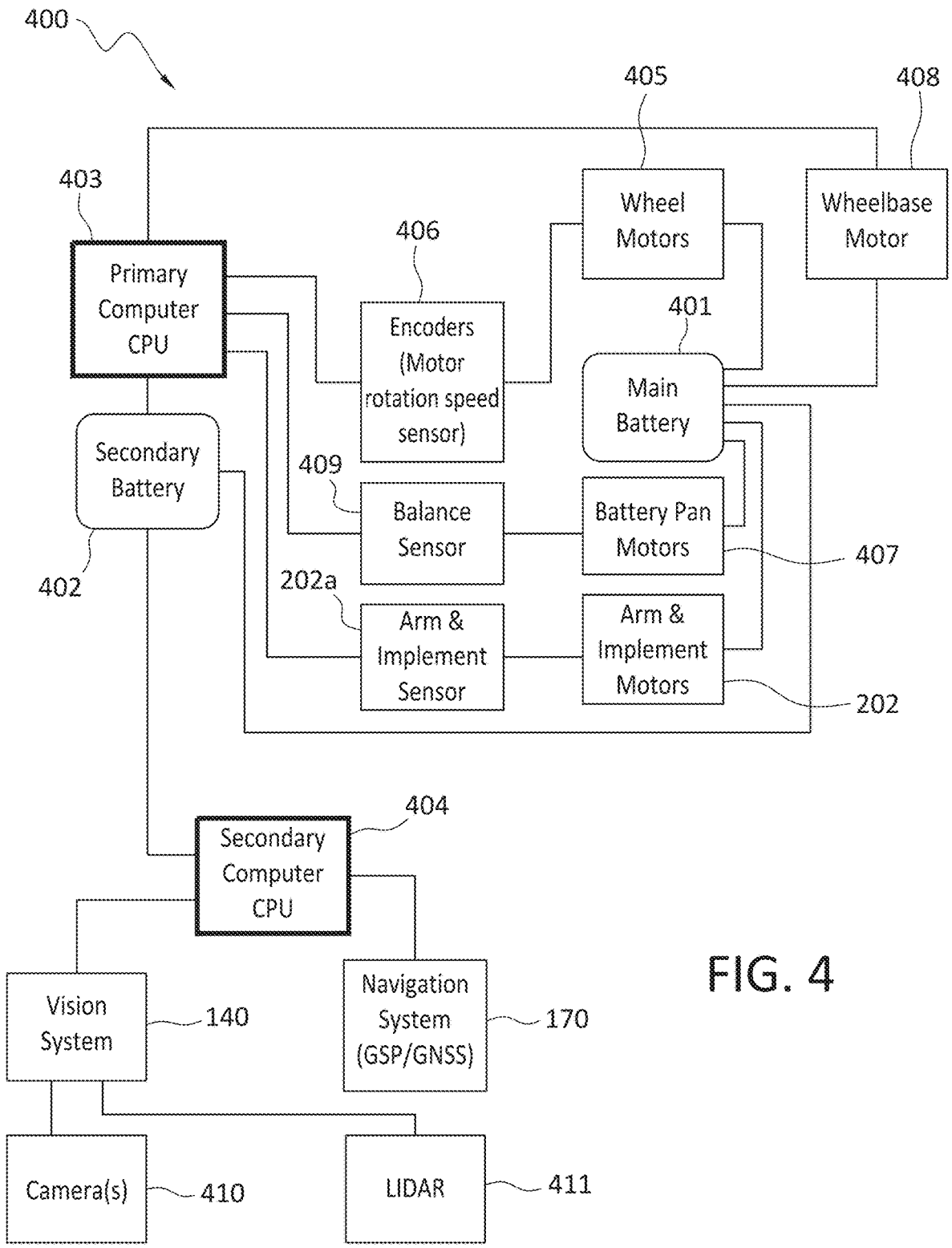
FIG. 4 illustrates an exemplary block diagram of one or more internal components of an autonomous ground vehicle, in accordance with the present disclosure.

FIG. 4 illustrates an exemplary block diagram of one or more internal components of an autonomous ground vehicle 101, in accordance with the present disclosure. The autonomous ground vehicle 101 can be powered with batteries, for example, but not limited to, rechargeable batteries. For example, in at least one embodiment, the autonomous ground vehicle 101 utilizes two batteries, a main battery 401 and a secondary battery 402. These batteries may be single batteries or a set of connected batteries. The main battery 401 may power one or more wheel motors 405 that operate the wheels 120, and one or more encoders 406 that control the speed of each wheel motor 405 and are in turn coordinated, i.e., controlled, by a primary computer central processing unit (CPU) 403 to turn at the correct rotational speeds to allow forward and backward motion as well as turning left or right. The articulated arm(s) 111 and its/(their) motors in each swivel point 202 are controlled by the primary CPU 403 as well, responding to sensor 202a information fed by the articulated arm(s) 111, the arm motors in each swivel point 202, and the implement 150, so that the autonomous ground vehicle 101 moves in concert with the action of the articulated arm 111 and any implement 150 attached to it. The primary CPU 403 also controls the wheelbase motors 408 to change the length and width of the wheelbase of automated ground vehicle 101. The primary CPU 403 also controls the battery pan motor 407 to move the balance point of the automated ground vehicle 101 based on input from a balance sensor 409. A secondary computer central processor unit (second CPU) 404 is connected to the secondary battery 402 and controls the vision portion 140 and the navigation portion 170 for the autonomous ground vehicle 101. The vision portion 140 includes one or more cameras 410 attached to the autonomous ground vehicle 101 to capture visual information using RGB, infrared methods. The vision portion 140 also includes a Light Detection and Ranging (LIDAR) system 411 to detect objects and obstacles as the autonomous ground vehicle 101 moves.

Figure 5:
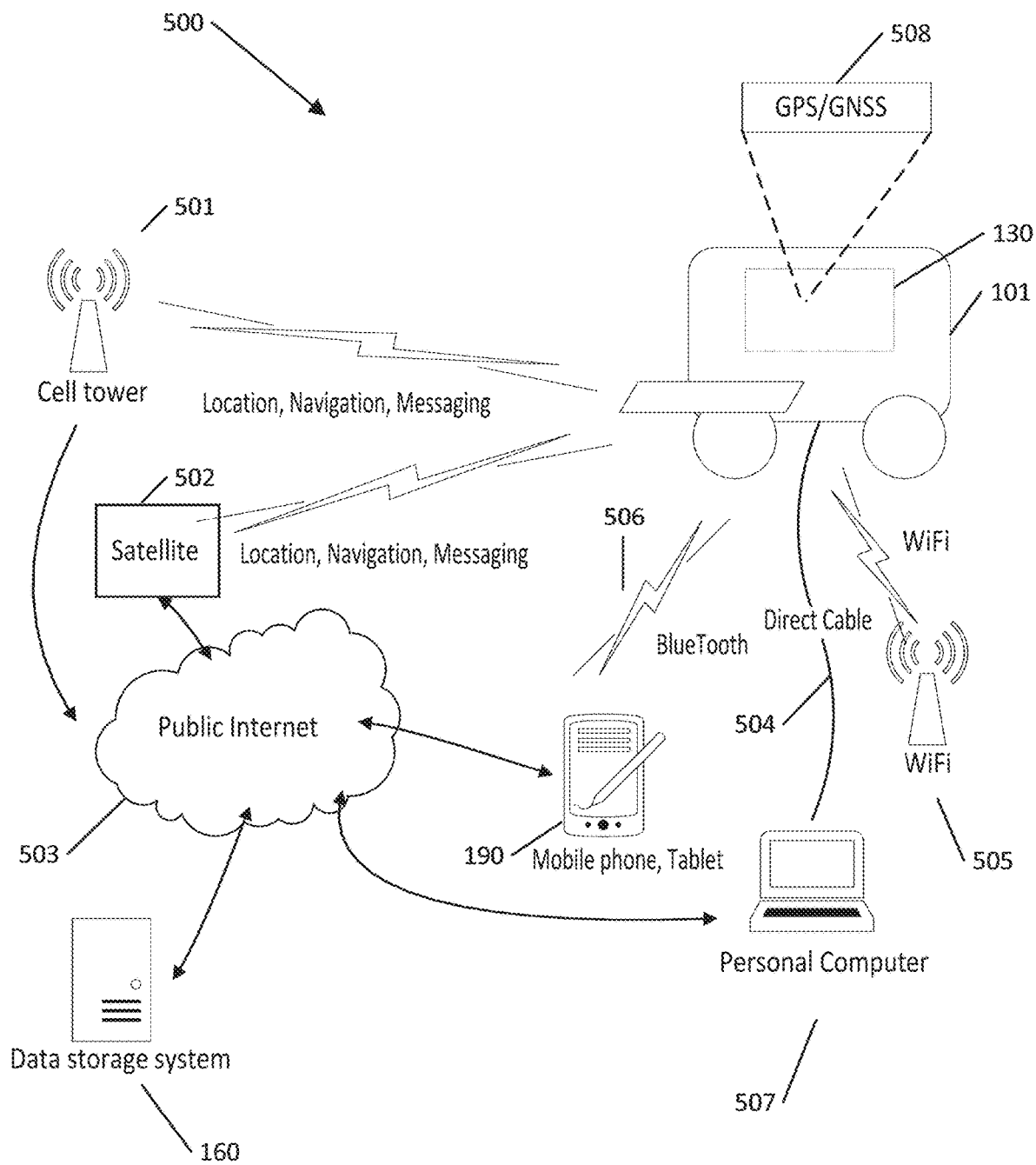
FIG. 5 illustrates one or more communications methods used to configure and control an autonomous ground vehicle and for the autonomous ground vehicle to communicate its operations with the operator, in accordance with the present disclosure.

FIG. 5 illustrates one or more communications methods used by the control module 130 to send and receive information between the autonomous ground vehicle 101 and external parts of the system 100, in accordance with an exemplary embodiment of the disclosed subject matter. As shown in FIG. 5, the vehicle moves based on the navigation portion 170 that uses Global Positioning System (GPS) to communicate with one or more satellites 502 and at least one cellular communications systems 501 via a Global Navigation Satellite System (GNSS) using a commercially available GPS/GNSS computer module 508, giving the autonomous ground vehicle 101 information on its location and its path. In addition, these methods are used to receive commands from the data storage system 160 and report on the autonomous ground vehicle's 101 status to the data storage system 160 via a communications network, for example, but not limited to, the public Internet 503. Locally the autonomous ground vehicle 101 can be controlled and communications received from and sent to it using, for example, but not limited to, Bluetooth 506, if within 30 feet or less, with Wi-Fi 505, if such a network is available, or by direct cable 504, as required to connect to a Personal Computer 507, or a Mobile smartphone or a tablet computer 190. In addition, the GPS/GNSS communications systems can be implemented using secured GPS/GNSS transmitters and receivers to provide precise position information during operation of the autonomous ground vehicle to control movement and course correction in real-time.

Figure 6:
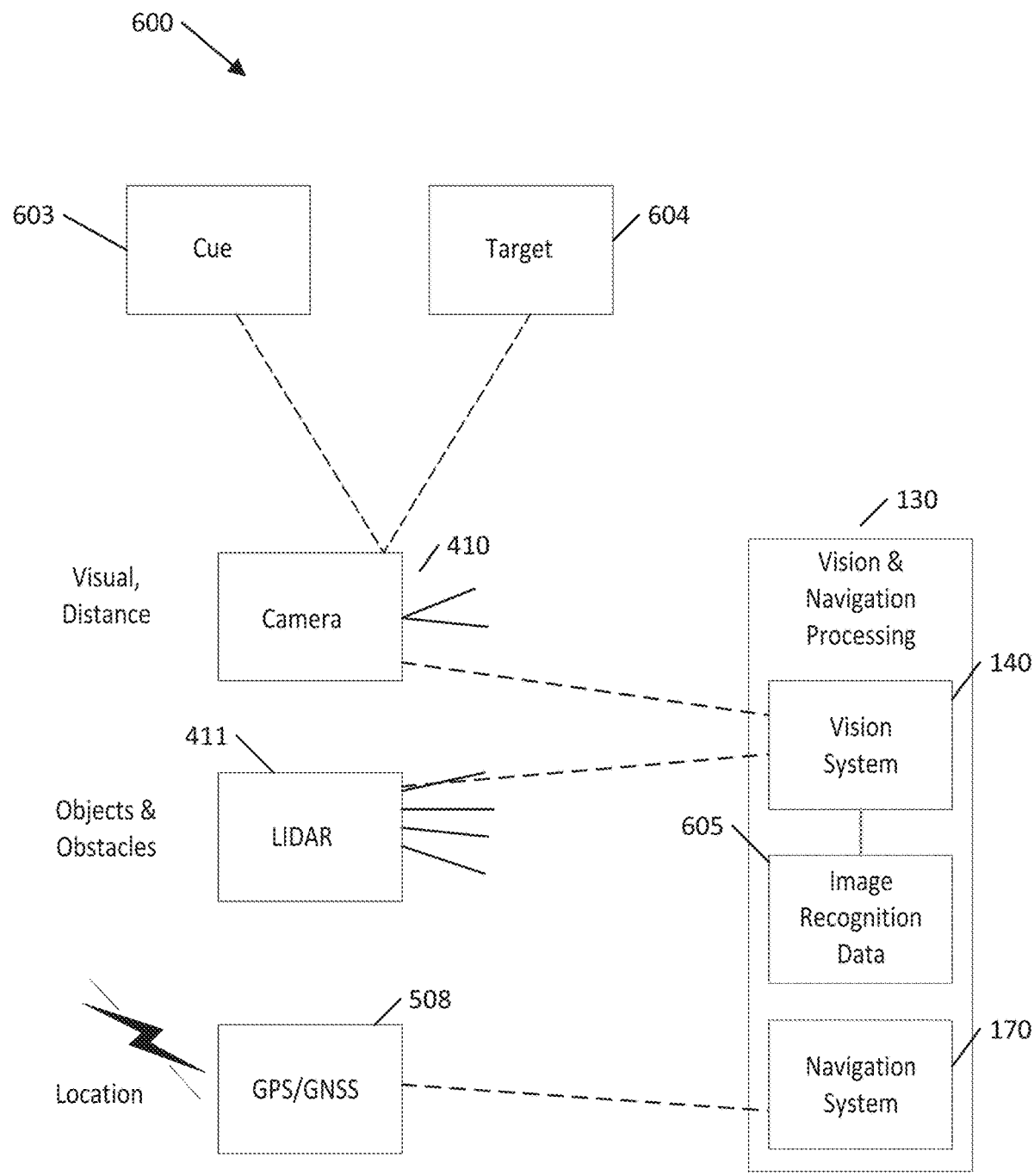
FIG. 6 illustrates a vision system and a navigation system used to determine movement of an autonomous ground vehicle across the field of operation, in accordance with the present disclosure.

FIG. 6 illustrates a vision and navigation system 600 used to determine movement of an autonomous ground vehicle across the field of operation 180, in accordance with the present disclosure. Within the central control module 130, the vision portion 140 and the navigation portion 170 use information obtained in real time combined with pre-programmed commands and sensor information obtained by the one or more cameras 410, location information obtained from the GPS/GNSS module 508, and information from the LIDAR system 411. The vision and navigation portions within the control module 130 are comprised of the one or more cameras 410 affixed to the body portion 110 providing visual information about a target 604 or a navigation cue 603 that determines a path of travel based on pre-programmed commands in the method of operation 300; the GPS/GNSS computer module 508 that determines location and position; and the LIDAR system 411 which senses objects or obstacles in and around the path of travel. The information from the system 600 is used by the second CPU 404 and, optionally the primary CPU 403, to control the vehicle's actions. Some, but not all, tasks require image recognition data 605 to be used in processing the target 604 or a cue 603.

Figure 7:
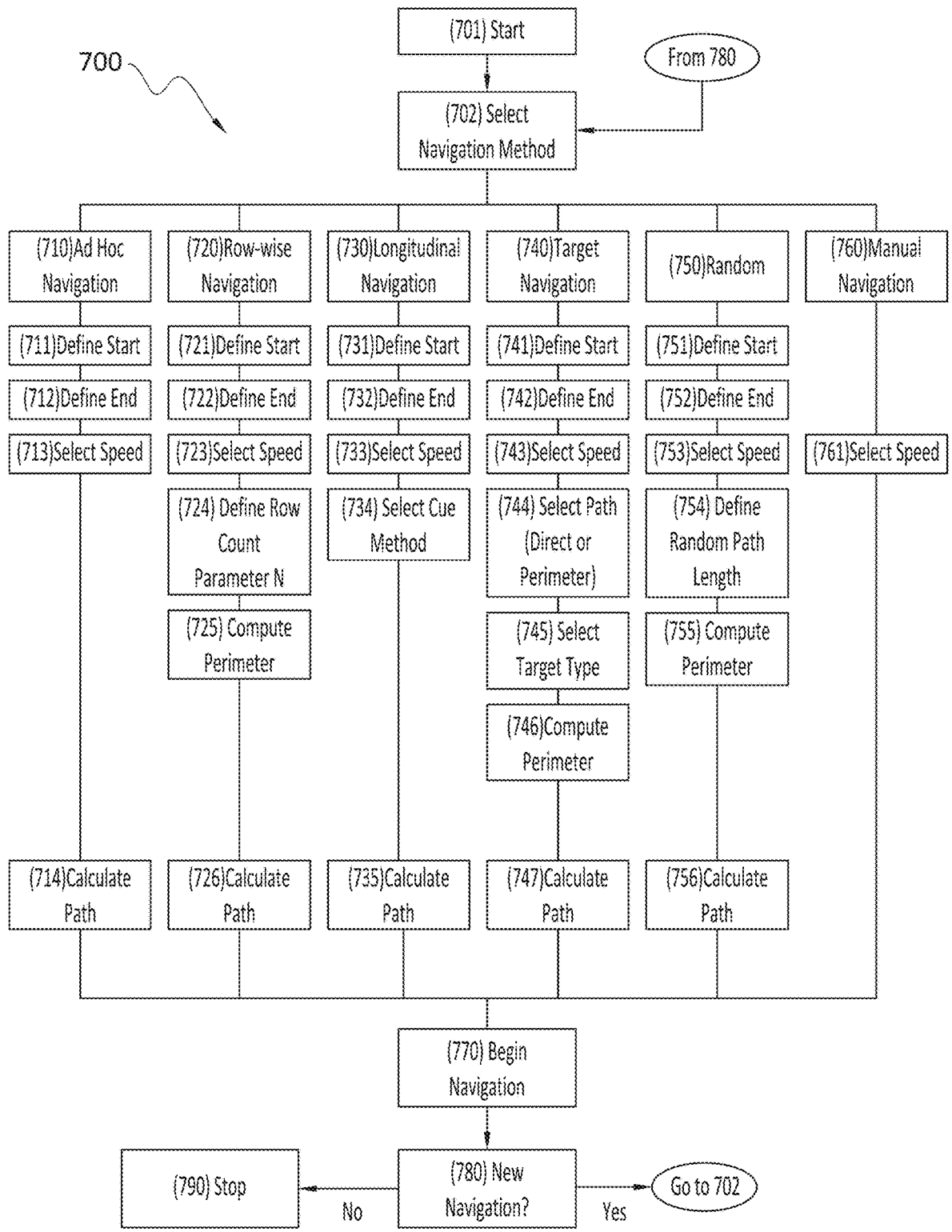
FIG. 7 illustrates a navigation command sequence that allows an operator to designate the steps and parameters of alternative methods of movement of an autonomous ground vehicle in a field of operation, in accordance with the present disclosure.

FIG. 7 illustrates a navigation command sequence 700 that allows an operator to designate the steps and parameters of alternative methods of movement of an autonomous ground vehicle in a field of operation, in accordance with the present disclosure. The navigation command sequence 700 starts 701 and the operator may select 702 among one or more methods of navigation including an ad hoc method 710, a row-wise method 720, a longitudinal method 730, a target method 740, a random method 750, or a manual method 760. The operator may also select more than one method in a set of instructions in 300, for example, but not limited to, choosing to start a task using the ad hoc method 710 of navigation from a defined start point 711 to a defined end point 712 and at a selected rate of travel, i.e., speed, 713 of n feet per second. Then, upon completion of the ad hoc method 710 of navigation, or entirely independently of the ad hoc method 710, the autonomous ground vehicle 101 might execute the row-wise method 720 of navigation. For example, by following a path from the same or another start point 721 and ending at the same or another end point 722 by advancing at the same or another speed 723, using a row-wise movement for a number of rows. When the number of rows, i.e., a row count parameter 724, N is set to 1, it means for the navigation path to begin at row 1 and advance forward boustrophedonically through a field bounded by the area of operation 180. The navigation portion 170 calculates the location of the perimeter from the starting point 721 and the end point 722, and calculates a row-wise navigation path 726 to be taken using the row-wise method 710. By varying the value of N in combination with the end point 722, the autonomous ground vehicle 101 will advance to the N+1th row before turning boustrophedonically skipping N rows to begin at row 2, then to N+2, then to row 3, etc. until the boundary of the field of operation 170 is reached, at which point the autonomous ground vehicle 101 returns to the defined end point, and executes the next step in the navigation instruction, if any. Examples of row-wise navigation paths of travel are illustrated in and described below in relation to FIG. 12.

Returning to FIG. 7, in the longitudinal method 730 of navigation, the autonomous ground vehicle 101 uses similar or a different start point 731, similar or a different end point 732, and similar or a different speed 733 to advance using a cue method 734 before calculating a longitudinal travel path 735. The cues may be augmented reality (AR) codes that have embedded information interpreted by the vision system 140 or may use physical cues recognized by interpreting repeating physical characteristics such as a fence post.

For the target method 740 of navigation, in FIG. 7, the autonomous ground vehicle 101 uses the same or another start point 741 and the same or another end point 742 in combination with the same or another speed 743 before beginning. At its present location, the autonomous ground vehicle scans the field of operation 180 seeking to detect 745 a target using the image recognition data 605 for comparison and to calculate a path to the target. However, the operator may override the operation by selecting 744 a predefined path method, either a direct path or a perimeter path. If not overridden, the autonomous ground vehicle 101 uses artificial intelligence to determine the path to the target based on the condition of the terrain, the ability to discern rows, the density and height of crops, the clarity of images in the vision system, and other determinants. Upon acquisition of the target 604 the autonomous ground vehicle 101 computes 746 the perimeter, then calculates 747 the path (either direct or indirectly around the perimeter of the field of operation 180) and moves to the target 604.

For the random method 750 of navigation, in FIG. 7, the autonomous ground vehicle again uses the same or a different defined start point 751 and the same or a different defined end point 752 point to move at the same or a different defined speed 753 along a random path that is bounded by the perimeter 755 and a defined random path length 754 to move in a calculated random path 756. This method may be suited to collecting nuts in a field where trees are arranged randomly and the entire field can be more effectively covered with the random method 750 of navigation instead of trying to move the vehicle in rows as in the row-wise method 720 or in straight lines as in the longitudinal method 730.

For the manual method 760 of navigation, in FIG. 7, the speed of the autonomous ground vehicle 101 is specified as in the other methods 710 through 750, but all other movement is manually controlled externally using a command program on a mobile device or personal computer 190.

At the conclusion of the navigation method selections 710 through 760, in FIG. 7, the autonomous ground vehicle 101 begins to execute 770 the calculated navigation path commands and at the conclusion of those commands checks 780 to see if there is a next step for a new navigation. If there is a next step the system returns to the processing at 702 for the new step, or, if there is not a next step, stops 790 the navigation.

Figure 8:
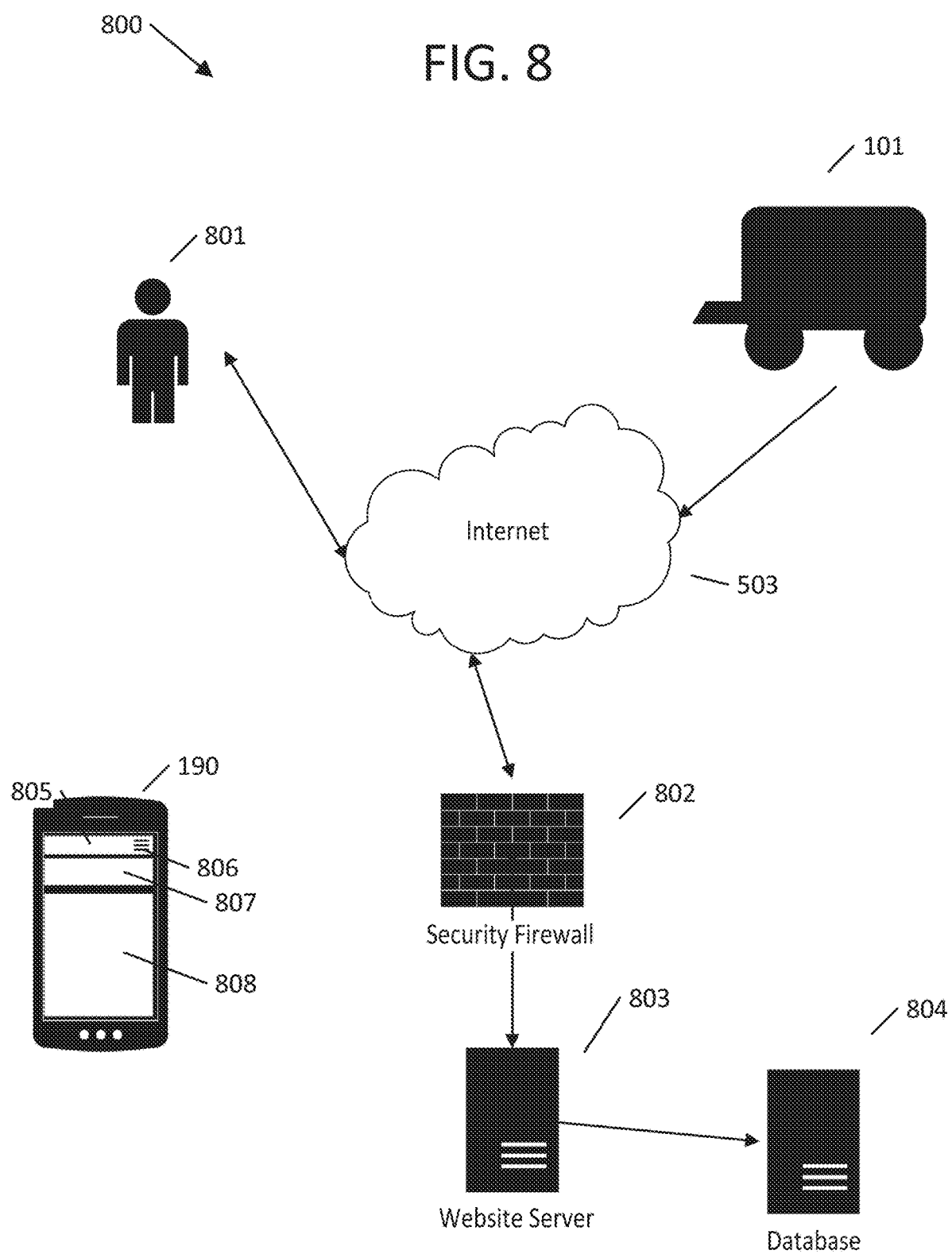
FIG. 8 illustrates components of a data storage and related website used to house information gathered from an autonomous ground vehicle's operations and parameters of operation defined by an operator, in accordance with the present disclosure.

FIG. 8 illustrates components of a data storage system 800 which includes the communications gathered from an autonomous ground vehicle 101 and a human operator 801 via the public Internet 503 in accordance with an exemplary embodiment of the disclosed subject matter. A security system represented by, for example, but not limited to, a firewall 802 protects one or more website servers 803 that store and serve up data from one or more databases 804. The human operator 801 uses, for example, but not limited to, a mobile device 190 or, as shown in FIG. 5, any other computer 507 properly authorized and connected to the Internet 503 or with a direct cable 504, Bluetooth 506, or WiFi 505. Returning to FIG. 8, the website allows the human operator 801 to log in and access account information 805, select from options in a menu of functions 806, choose sections of information and choices 807, and see a display area 808 by which information and commands can be set up, changed, or removed, and reports on the operation of the vehicle communicated to the operator.

Figure 9:
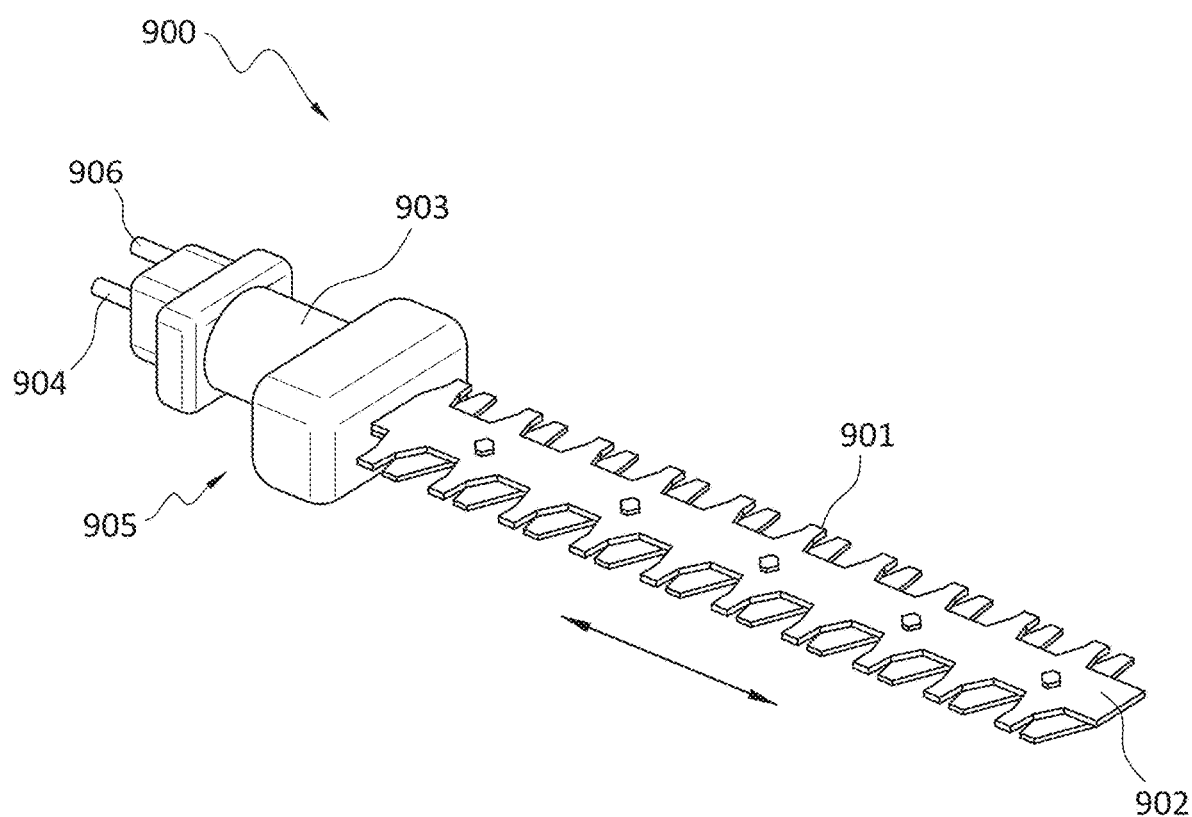
FIG. 9 illustrates an exemplary implement intended for trimming grass and weeds in and near a fence or in an open area when attached to an articulated arm of an autonomous ground vehicle, in accordance with the present disclosure.

FIG. 9 illustrates an exemplary implement for trimming grass and weeds in and near a fence or in an open area when attached to an articulated arm 111 of the autonomous ground vehicle 101. In FIG. 9 is shown an electric trimmer bar 900 for the purpose of trimming and is similar to commercially available electric hedge trimmers. Multiple teeth 901 are mounted on a bar 902 with a moving portion and a fixed portion controlled by an oscillating motor 903 and a gear and the teeth 901 are configured to cut weeds and grass that come in contact with the trimmer bar. The implement 900 is configured to be attached to the articulated arm 111 at the distal end 111b making contact between the base 905 and the distal end 111b for the power connection 904 to control the oscillating motor 903 and with a sensor connection 906 that communicates with the control system 130 to indicate that the implement is working and if not to provide error information such as, but not limited to, the power is on/off.

Figure 10:
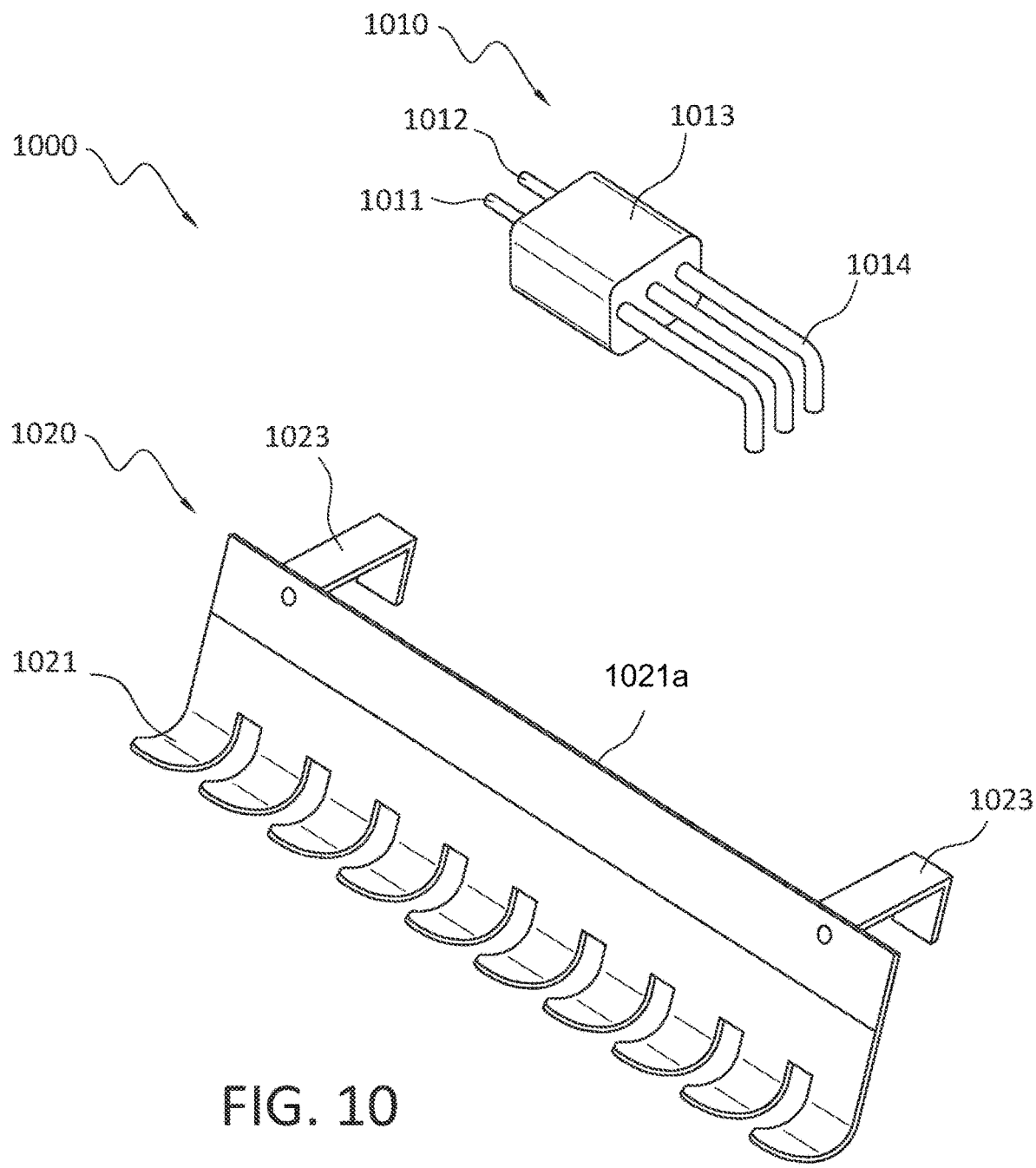
FIG. 10 illustrates an exemplary implement intended for moving vines out of a designated path to push them back into a growing area, commonly known as "vine turning," in accordance with the present disclosure.

FIG. 10 illustrates an exemplary implement intended for moving vines out of a designated path to push them back into a growing area, an action commonly known in farming as "vine turning". A vine turner implement 1000 is an example of an implement with multiple parts including a gripping mechanism 1010 and a passive section 1020. The gripping mechanism 1010 is configured to be operatively attached to the distal end 111b of the articulated arm 111 for the purpose of gripping the vine. The passive section 1020 has clips 1023 connected to a top portion 1021a of the passive section 1020 and each of the clips 1023 are configured to be removeably attached to and along the motor connecting segments 203 to passively push the vine as the articulated arm 111 moves outward from the body portion 110 of the autonomous ground vehicle 101 by the action of the arm motors in each swivel point 202 and the changing position as a result of arm sections 205 moving out and back from the body portion 110 of the autonomous ground vehicle 101. The passive section 1020 also includes a section with flexible fingers 1021 below the top portion 1021a to assist in pushing a vine back to a designated area within a growing area.

Figure 11:
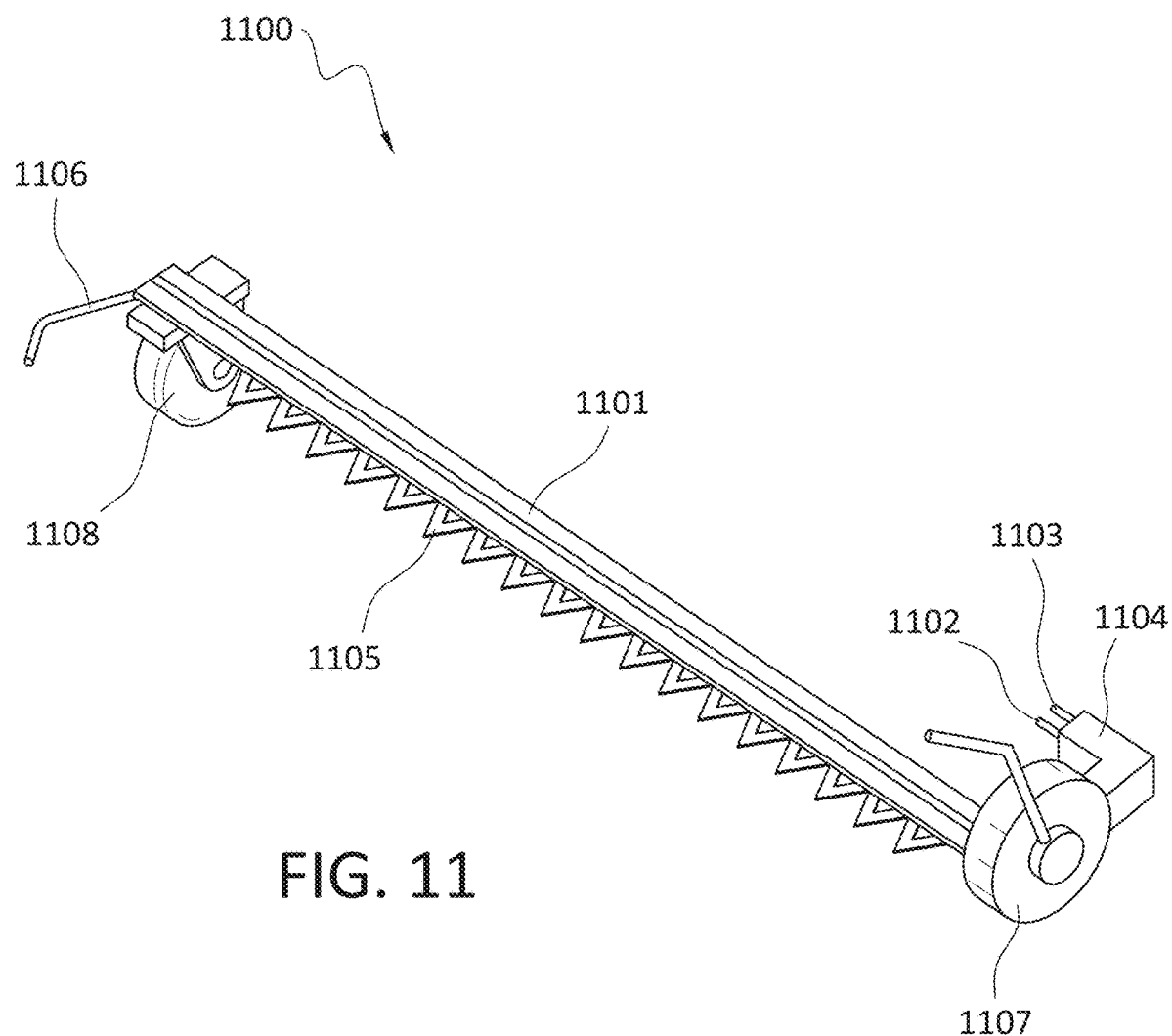
FIG. 11 illustrates an exemplary implement intended for cutting a large area of crops such as, for example, but not limited to, hay or buckwheat using an oscillation cutting action across a length of an articulated arm as an autonomous ground vehicle moves into and through a field of operation, in accordance with the present disclosure.

FIG. 11 illustrates an exemplary implement of a cutter bar 1100, sometimes called a sickle bar, for the purpose of cutting a large area of crops such as, for example, but not limited to, tall grass or grain crops such as buckwheat or hay. The cutter bar 1100 includes blades 1105 configured to move in a cutting motion by the action of a fixed and movable section 1101 of the bar 1100 when attached to the distal end 111b of the articulated arm 111 as an autonomous ground vehicle 101 moves into and through the field of operation 180. A motor 1102 of the implement moves a gear 1107 that moves the blades 1105 in an oscillating motion to slice the crop leaving the cut stalks of the crop to fall behind the cutter bar 1100 as the autonomous ground vehicle 101 moves through the field, which is an activity commonly used in farming operations. By extending the cutter bar 1100 in front of the autonomous ground vehicle 101 using the articulated arm's 111 articulating action away from the side of the vehicle body, the articulated arm 111 becomes a forward cutting surface mounted at an angle, so that the grain or hay falls away from the body of the vehicle and its wheels. A wheel 1108 may be rotatably mounted at the end of the cutter bar 1100 to support the weight of the cutter bar 1100. A motor 1107 is supported by a body portion 1104 that contains a power attachment 1102 and a sensor attachment 1103 that are configured to "plug in," i.e., operatively connect, to the distal end 111b of the articulated arm 111. A guide 1106 is affixed to the end of the bar 1101 to mark the end of the bar visually and for safety.

Figure 12:
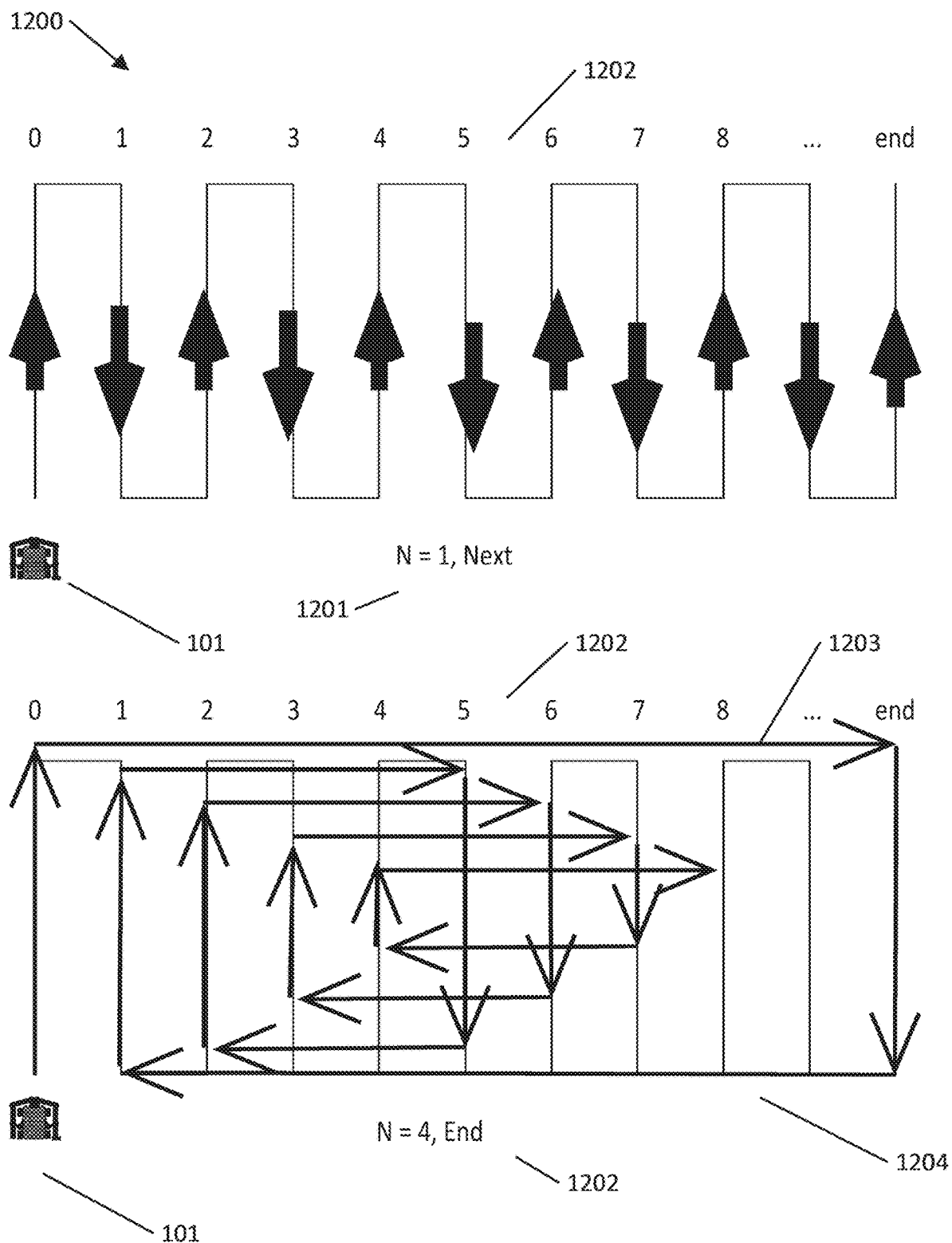
FIG. 12 illustrates an exemplary pattern of movement through a field of operation using a row-wise navigation movement, identifying and moving longitudinally down a row and then turning to return down another row, one-by-one or alternatively skipping a designated number of rows before turning, in accordance with the present disclosure.

FIG. 12 illustrates an exemplary pattern of movement through a field of operation in which an autonomous ground vehicle 101 moves along paths between growing areas. In FIG. 12, the illustration uses two examples of the row-wise method 720 of navigation as described above in relation to FIG. 7. In FIG. 12, in a first example 1201, the autonomous ground vehicle 101 follows a simple down-one-row and up-the-next to make a circuit around the defined area of operation, and in a second example 1202, the vehicle follows a row skipping pattern. In both examples, the calculated row-wise navigation path 726 is defined by a combination of the row count parameter 724 instructing the autonomous ground vehicle 101 to advance to the Nth row detecting the presence of the row 1205 and its extents using the vision system 140, monitoring the autonomous ground vehicle's 101 location using navigation 170, avoiding obstacles and detecting crops using the LIDAR system 411 while keeping track of a number of the row 1205 in which the autonomous ground vehicle 101 is currently located, where in the first example 1201 N=1 and in the second example 1202 N=4. In addition, the autonomous ground vehicle 101 advances in the first example 1201 to a Next row value and in the second example 1202, the autonomous ground vehicle 101 advances to the "End", i.e. to the set of rows where the perimeter of the field of operation 180 is reached, before returning to the N+1th row, then following the sequence of row advancement in groups of N rows. In the second example 1202, the autonomous ground vehicle advances in groups of four rows, navigating from an end of a first row (row #0 of 1202), then to an end row along what is commonly called a head row 1203, then down the end row (row #end of 1202) to a tail row 1204, before returning to a second row (row #1 of 1202), then along the head row 1203 to a sixth row (row #5 in 1202), then down the sixth row, then back along the tail row 1204 to a third row (row #2 of 1202), and so on. Note that the result of this movement of the autonomous ground vehicle 101 traverses a group of rows in the same direction. By varying the value of N and the ending position "End" or "Next" the autonomous ground vehicle 101 can be made to create patterns of movement for a variety of purposes.

Figure 13:
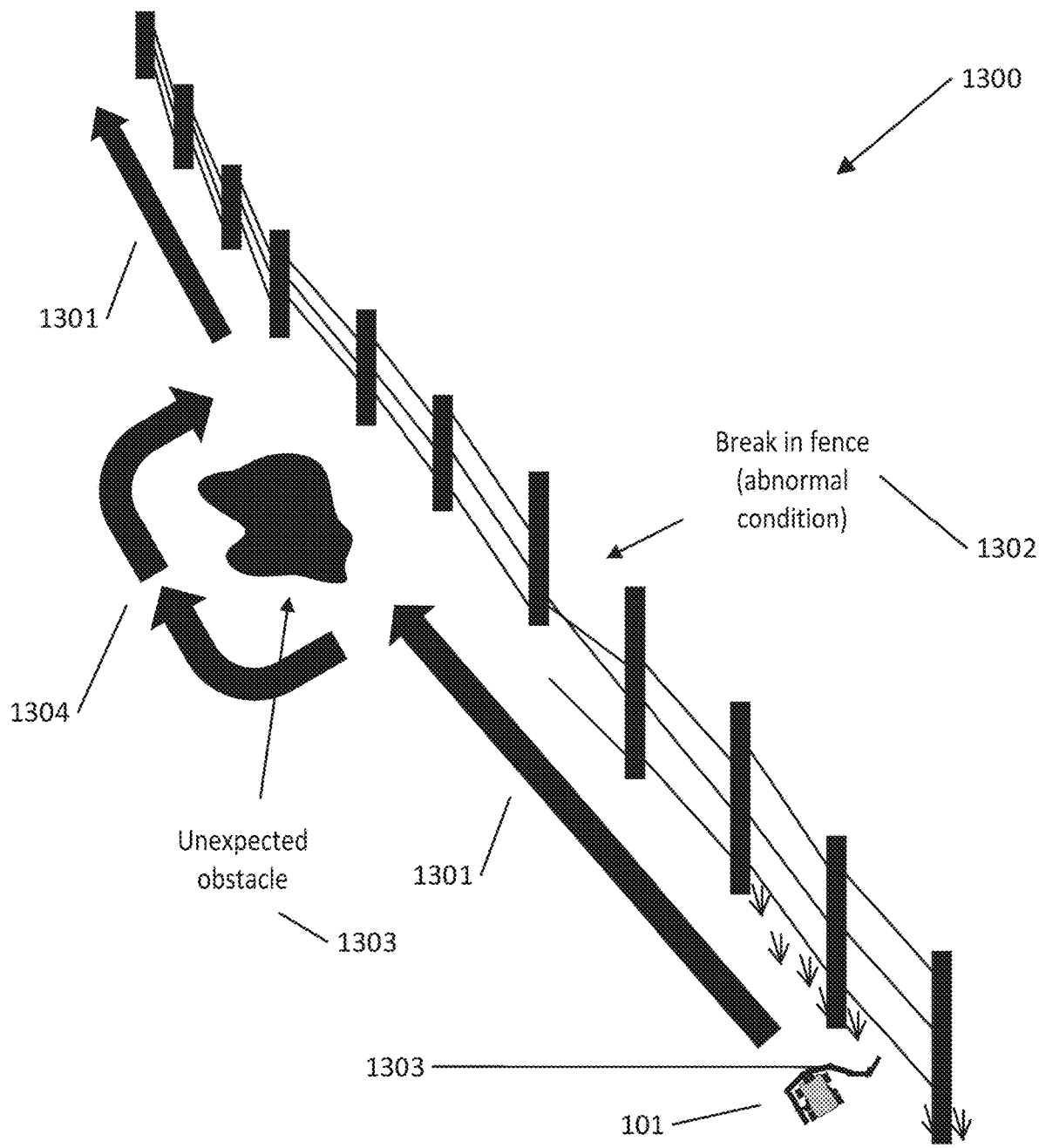
FIG. 13 illustrates an exemplary pattern of movement for an autonomous ground vehicle along a fence in a longitudinal path, in accordance with the present disclosure.

FIG. 13 illustrates an exemplary pattern of movement for an autonomous ground vehicle using the longitudinal pattern 730 discussed above in relation to FIG. 7. In FIG. 13, navigation of the autonomous ground vehicle 101 that is combined with a trimmer implement 900 to perform the task of following a path 1301 next to a fence 1310 includes, activating the trimmer implement 900 to trim an area under and next to the fence 1310, avoiding obstacles 1303 detected in its path, changing path 1304 in response to detecting the obstacle 1303 in its path, then returning to the normal path 1301 once past the obstacle 1303. The navigation further includes reporting to the human operator any abnormal conditions 1302 of the fence 1310 that are, for example, but not limited to, fence conditions different from a previously recorded visual record of the fence or differences between sections of the fence 1310, in the illustration, as an example, where a break in the fence has occurred. When the human operator has predefined the path as both sides of the fence, the vehicle turns at the end of the fence and proceeds down the opposite site, such that the area under the fence is cut from both sides to the length of the trimmer implement. The fence may be marked by cues 603 (such as an Augmented Reality ("AR") code mounted on a fence post) or by defined targets 604 (such as the shape of the fence post itself as a target), and the operator may navigate the path manually 760, recording that path 360, and playing back that session 316.

Figure 14:
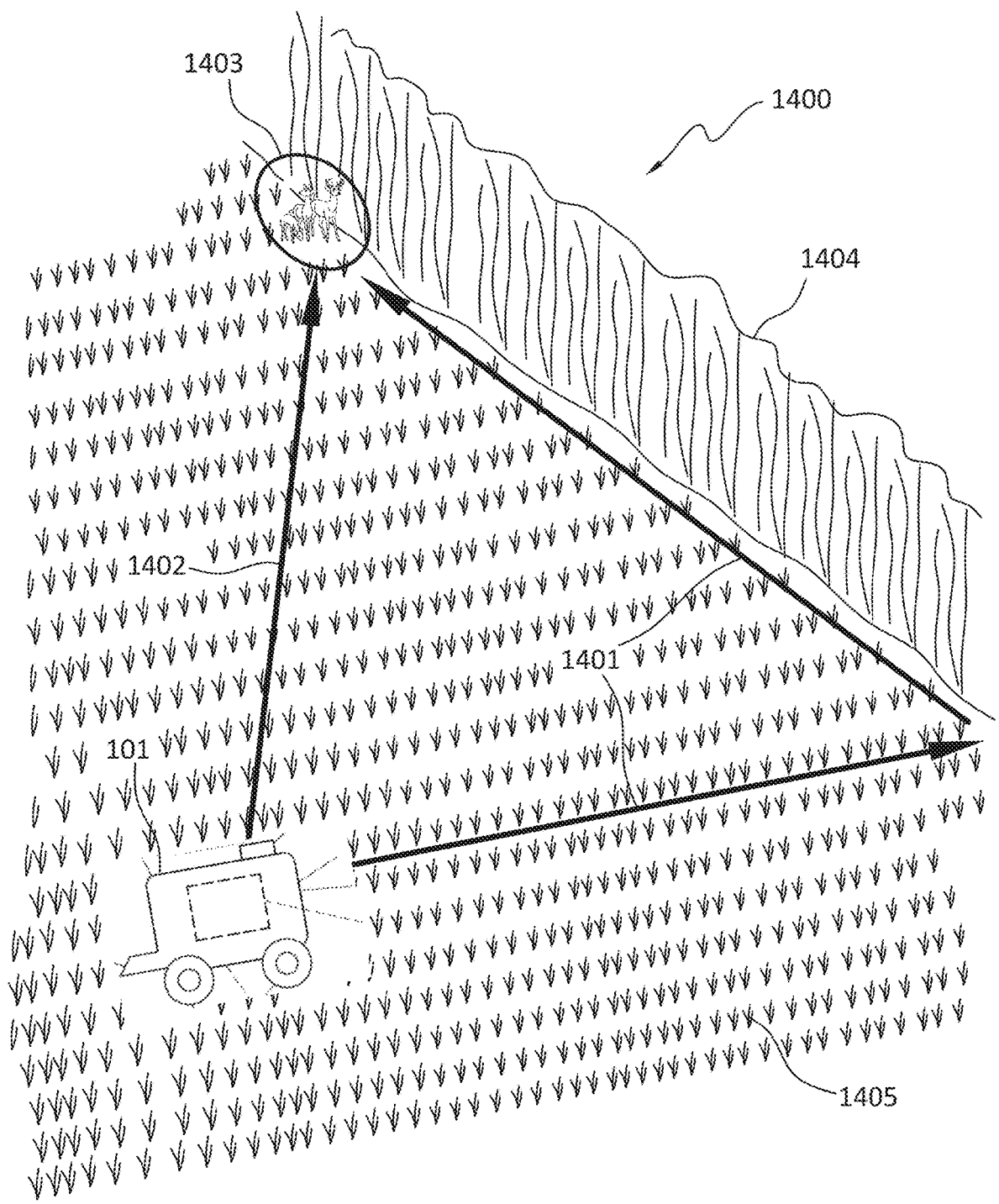
FIG. 14 illustrates an exemplary pattern of movement for an autonomous ground vehicle in a field of operation using artificial intelligence to decide whether to move directly toward a target through a field of operation using a row-wise navigation movement or along the perimeter of the field of operation avoiding direct movement, in accordance with the present disclosure.

FIG. 14 illustrates an exemplary pattern of movement for the autonomous ground vehicle 101 in the field of operation 180 using artificial intelligence to decide whether to move directly 1402 toward a target 1403 through the field of operation 180, or along the perimeter 1401 of the field of operation avoiding a direct path. In this illustration the target 1403 is a group of deer detected at a distance along the tree line at the edge of the field of operation 180. At a distance of up to 400 feet the autonomous ground vehicle 101 uses the vision system 140 to locate the possible target 1403, and identify it as a deer 1403 or other object using image recognition data 605, and then selects 744 the predefined path method to use, either directly 1402 through the field of operation 180 or down the rows 1405 between a crop and around the perimeter 1401 of the field of operation 180 to reach the target 1403. The operator may choose to select 744 only one of the navigation methods, instead of having the autonomous ground vehicle 101 make the selection 744 using artificial intelligence. In this example, no implement, no lights, nor a noise maker is needed because the autonomous ground vehicle 101 moves quickly in the direction of the target deer 1403, which the deer perceive as a threatening action and flee. The selected 743 speed of the autonomous ground vehicle 101 can include, for example, but is not limited to, fast/slow/fast/slow speeds. However, generally, the deer 1403 flee only until the threat goes away, so the autonomous ground vehicle 101 is programmed to continue moving rapidly 743 toward the target, and then stopping to see if the target moved or left the field of vision. After pausing for a preset length of time, e.g., but not limited to, one minute, the vehicle rescans the field of vision and begins pursuit again if a new or old target 1403 is detected. If one or more targets 1403 are not detected after a preset length of time 306, such as, but not limited to, ten minutes, the autonomous ground vehicle 101 returns to its defined 742 starting location. As the autonomous ground vehicle 101 is moving, it sends messages to the data storage system 160 to report its actions, current location, and any error conditions. Instead of a deer as the target 1403, the target 1403 may be another robotic vehicle moving in the field of operation 180 performing another farming task where the goal of the autonomous ground vehicle 101 in seeking that target is to augment the task being performed by the other robotic vehicle, such as unloading a full basket after harvesting a section of the crops. Thus, a group of autonomous ground vehicles 101 may be used together to perform tasks simply using the target-based navigation method, commonly known as a "swarm" of robotic vehicles.

Figure 15:
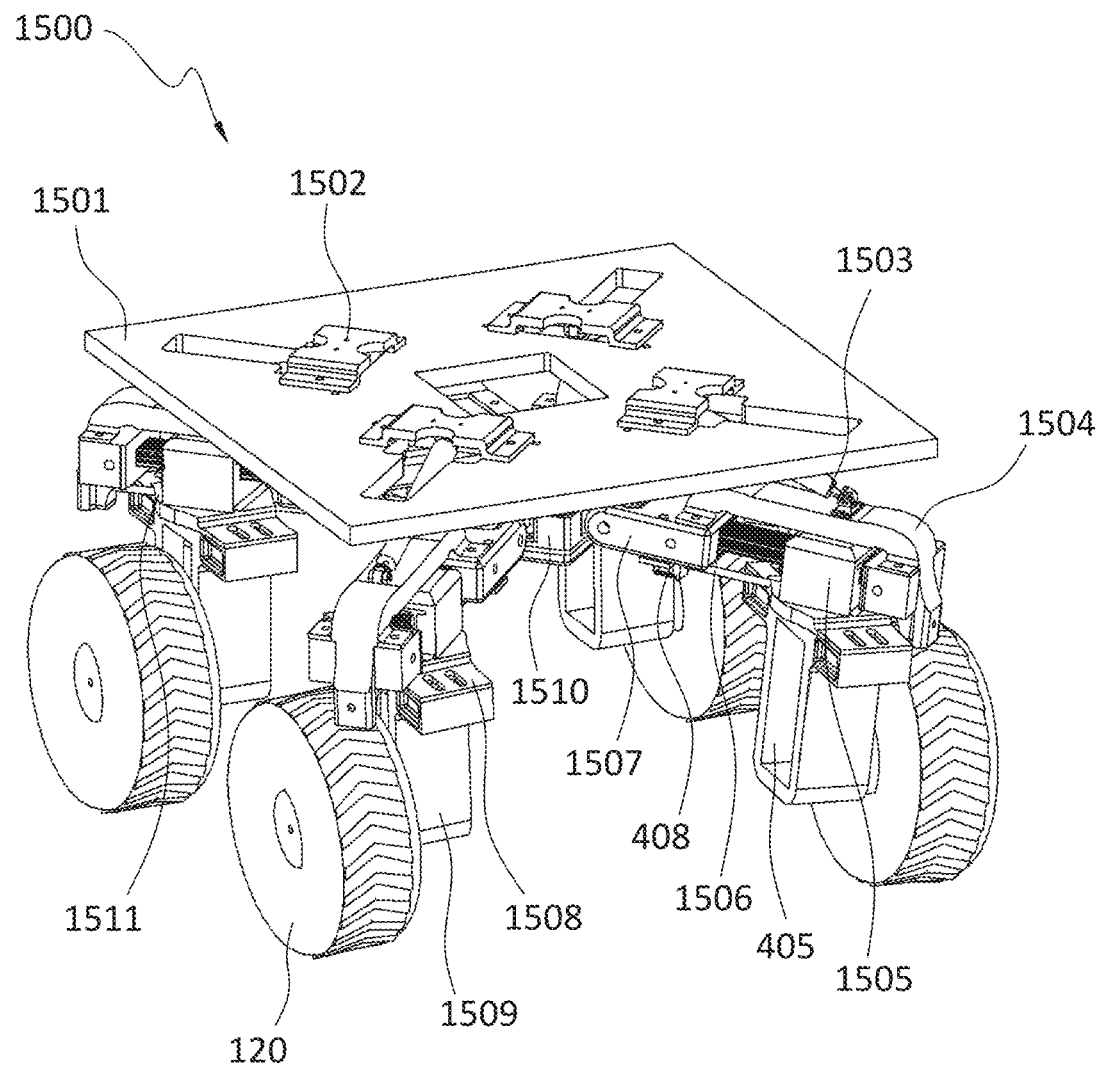
FIG. 15 illustrates an exemplary design of the wheelbase assembly whereby the distance between the wheels can be dynamically changed, the height of the base relative to the ground can be changed, and the ratio of length to width of the wheelbase can be changed, in accordance with the present disclosure.

FIG. 15 illustrates an exemplary design of a wheelbase assembly 1500 that allows for changing the location of the wheels 120 relative to one another, in accordance with the present disclosure. By moving the wheels 120 in unison further from the center of the autonomous ground vehicle 101 or closer to the center of the autonomous ground vehicle 101, the distance between the wheels is changed but the ratio of width to length is kept the same. In FIG. 15, the wheelbase assembly 1500 is shown in a perspective view from one corner of the vehicle 101 as if the body portion 110 of the autonomous ground vehicle 101 has been removed. The wheelbase assembly 1500 includes a base plate 1501 that is configured to be removeably mounted to a reciprocally-shaped protrusion (not seen) on an underside of the body portion 110 of the autonomous ground vehicle 101 provides attachments on the base plate 1501, including, for example, but not limited to, an opening 1515 formed in and through the center of the base plate 1501 and is configured to removeably receive and hold the reciprocally-shaped protrusion on a bottom of the body portion 110. The opening is generally not a complete circle, so it has at least one angle between adjacent wall portions with an angle of less than 180° to prevent the rotation of the body portion 110 when the reciprocally-shaped protrusion is inserted into the opening 1515. In addition, the base plate 1501 is connected to four independent wheel suspension components 1520 via a wheel hub 1510 and at the shock absorber mounts 1502 that are evenly-spaced around the substantially square opening 1515 in separate slots 1502a that are formed in and through the base plate 1501. Each of the shock absorber mounts 1502 is configured to connect to a top end of a shock absorber 1503 and a bottom end of the shock absorber 1503 is connected to an upper strut 1504 of each wheel suspension component 1520. The upper strut 1504 is attached at each of its ends to a sliding bar 1511 with slotted sides that is configured to permit a sliding movement 1505 to move freely along the length of the sliding bar 1511. The movement along the sliding bar 1511 is controlled by a linear actuator 1506 that is mounted to a connecting plate 1507 at the motor end of the linear actuator 1506 and to the sliding mechanism 1505 at the other end. The wheelbase motor 408, which can be a linear actuator motor 408, is in turn controlled by the settings as determined by the human operator in task 307 of the Operator Commands 300. Any vertical movement of the connecting plate 1507 as the autonomous ground vehicle 101 moves across the ground is dampened by the resistance of the shock absorber 1503 while limiting lateral movement so that the wheels do not wiggle as they move. The connecting plate 1507 allows the linear actuator 1506, the upper strut 1504 and the sliding bar 1511 to move up and down while the autonomous ground vehicle 101 is in motion over uneven terrain. The sliding mechanism 1505 is attached to an upper mount 1508, which is attached to a motor mount assembly 1509, inside of which the wheel motor 405 is mounted. The wheel motor 405 is connected directly to the wheel hub 1510 with the shaft of the motor. Electric wires and sensor wires are fed through the substantially square opening 1515 in the center of the base 1501. The linear actuator 1506 includes a wheelbase motor 408, which is configured to move the sliding mechanism 1505 in and out to change the location of the wheel 120.

in FIG. 15, the wheelbase assembly 1500 is designed to control the dimensions, that is, the 3-dimensional position, of each wheel 120 relative to each other in order to maintain an equal spacing of the wheels 120 front-to-back and side-to-side to accomplish the method of steering called differential steering with four motors. Steering and movement of the autonomous ground vehicle 101 is accomplished by causing the wheel motors 405 to turn in unison or not in unison, as suited to the task desired. Differential steering with four wheels is optimum when the wheelbase is square or nearly square, i.e. the front-to-back dimension is equal or nearly equal to the side-to-side dimension of the wheels. Rather than turning the axis of each wheel 120 directly with its wheel motor 405, the wheel axes are fixed and steering is accomplished by changing the speed and direction of each wheel motor 405 through the Encoders 406, which are controlled by the commands executed in the Primary Computer CPU 403.

While, in FIG. 15, differential steering is a common and widely used method of steering, this design allows for changing the wheelbase dimensions dynamically. By adjusting the wheelbase in width and length, the autonomous ground vehicle 101 can avoid driving over planted crops 1405. Pre-set marks can be provided in the control mechanism for common row widths, for example, but not limited to: 30 inches, which is typical for corn planting; and 15 inches, which is typical for soybean planting, for the convenience of a human operator. Another crop might be planted on rows that are multiples of 7.5 inches instead, which gives the human operator the ability to set the wheelbase at 15 inches, 22.5 inches, or 30 inches or 37.5 inches, and the limitation of the wheelbase width is simply controlled by the length of the four arms of the wheelbase assembly 1500.

in FIG. 15, by changing the location of the shock absorber mount 1502 within its slot 1502a on the base plate 1501, the angle at which the shock absorber 1503 meets the upper strut 1504 is changed, and therefore the height of the body relative to the ground and the angle at which the wheel meets the ground can be changed. The present disclosure does not preclude substituting the connecting plate 1507 that is an X shape with acute angles instead of right angles, and therefore the ratio of length to width of the wheelbase can be changed. By adjusting the wheelbase in length when both pairs of wheels 120 are changed together, the autonomous ground vehicle 101 can add stability to accommodate weights on the front or rear of the vehicle by a longer wheelbase. By changing the mounting of the shock absorber mount 1502 unequally, the vehicle can operate on a slant, to accommodate driving on a slope, for example. These changes can be set manually by the operator, or dynamically as the terrain changes using a balance sensor.

Figure 16:
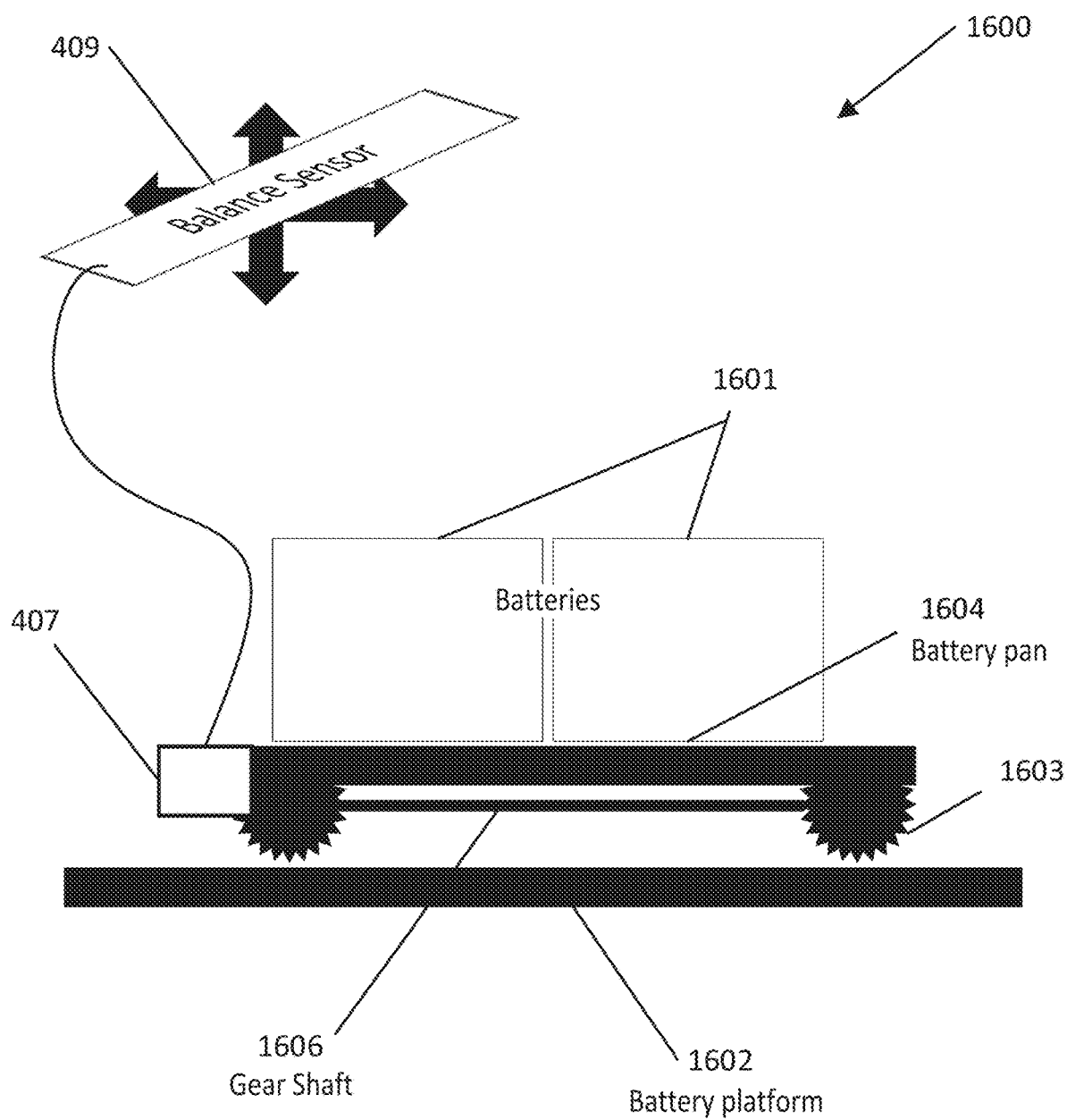
FIG. 16 illustrates an exemplary design for moving the location of one or more batteries inside an autonomous ground vehicle based on the weight balance of the vehicle front to back, in accordance with the present disclosure.

FIG. 16 illustrates an exemplary design for moving the location of one or more batteries 1601 inside the autonomous ground vehicle 101 based on a weight balance of the autonomous ground vehicle 101 front to back, in accordance with the present disclosure. The action of the battery or batteries 1601, which are mounted on a base 1604 that can be moved by action of a motor 407 by controlling a rack-and-pinion assembly consisting of a gear shaft rod 1606, gears 1603, and a platform 1602 to move the battery or batteries 1601 forward or backward within the body portion 110 of the autonomous ground vehicle 101. The motor 407 is controlled by a balance sensor 409 to detect imbalance fore and aft thereby providing additional stability to the vehicle. In lieu of a rack-and-pinion gear method, a linear actuator can be used to move the battery pan in the same manner.

Figure 17:
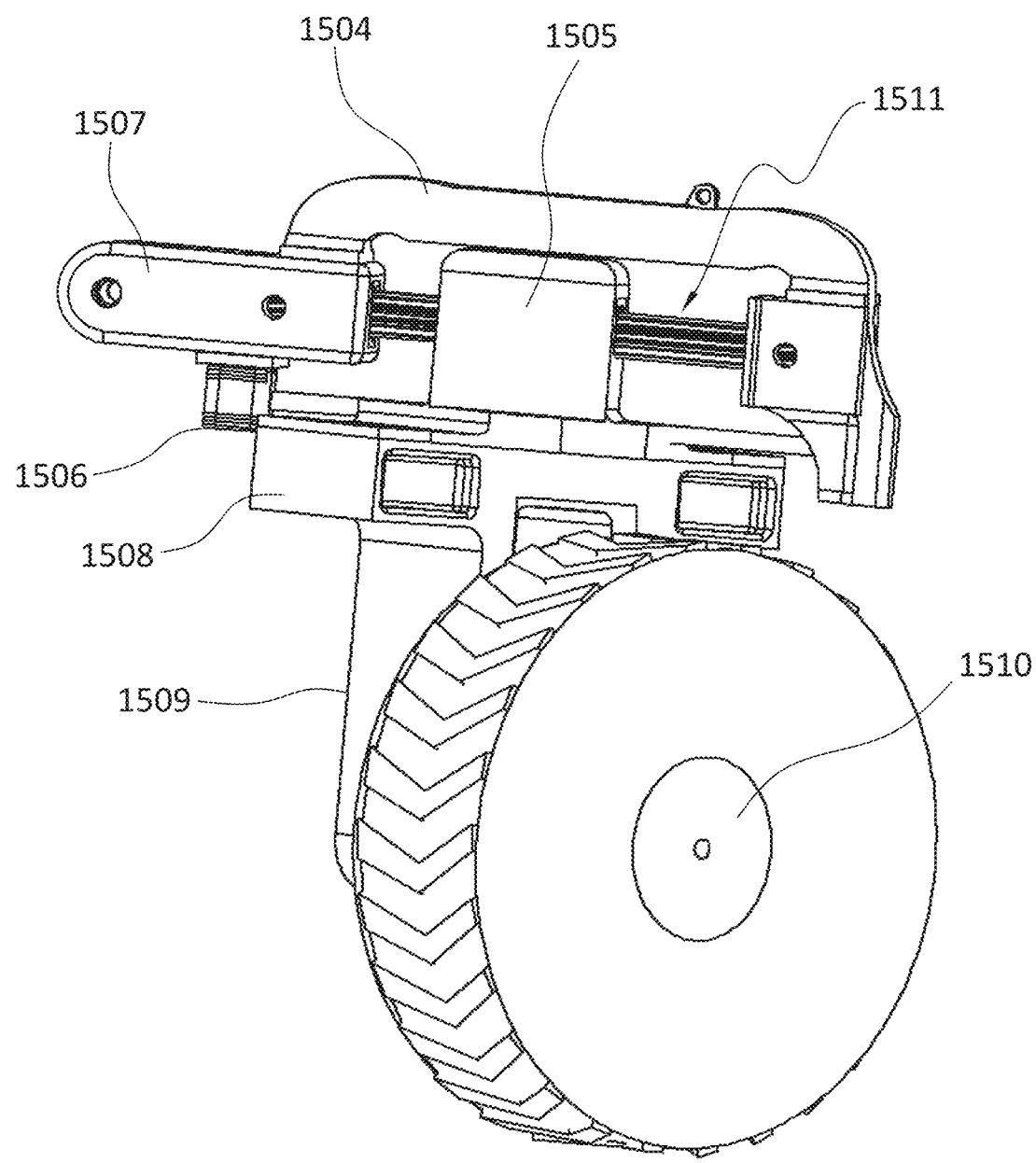
FIG. 17 illustrates a close-up view of the wheel-motor-arm assembly shown in FIG. 15 from the perspective of the sliding mechanism, in accordance with the present disclosure.

FIG. 17 illustrates a close-up view of the wheel assembly shown in FIG. 15 from the perspective of the sliding mechanism. The connecting plate 1507 is partially show on the left, to which is attached to a first end of the upper strut 1504 and the slotted bar 1511. The linear actuator 1506 causes movement of the sliding mechanism 1505 along the slotted bar 1511. The upper mount for the wheel-motor 1508 is attached to the sliding mechanism 1505. The motor mount 1509 is mounted at an angle to the upper mount for the wheel-motor 1508. The hub of the wheel 1510 to which the motor is attached is shown in the diagram.

Figure 18:
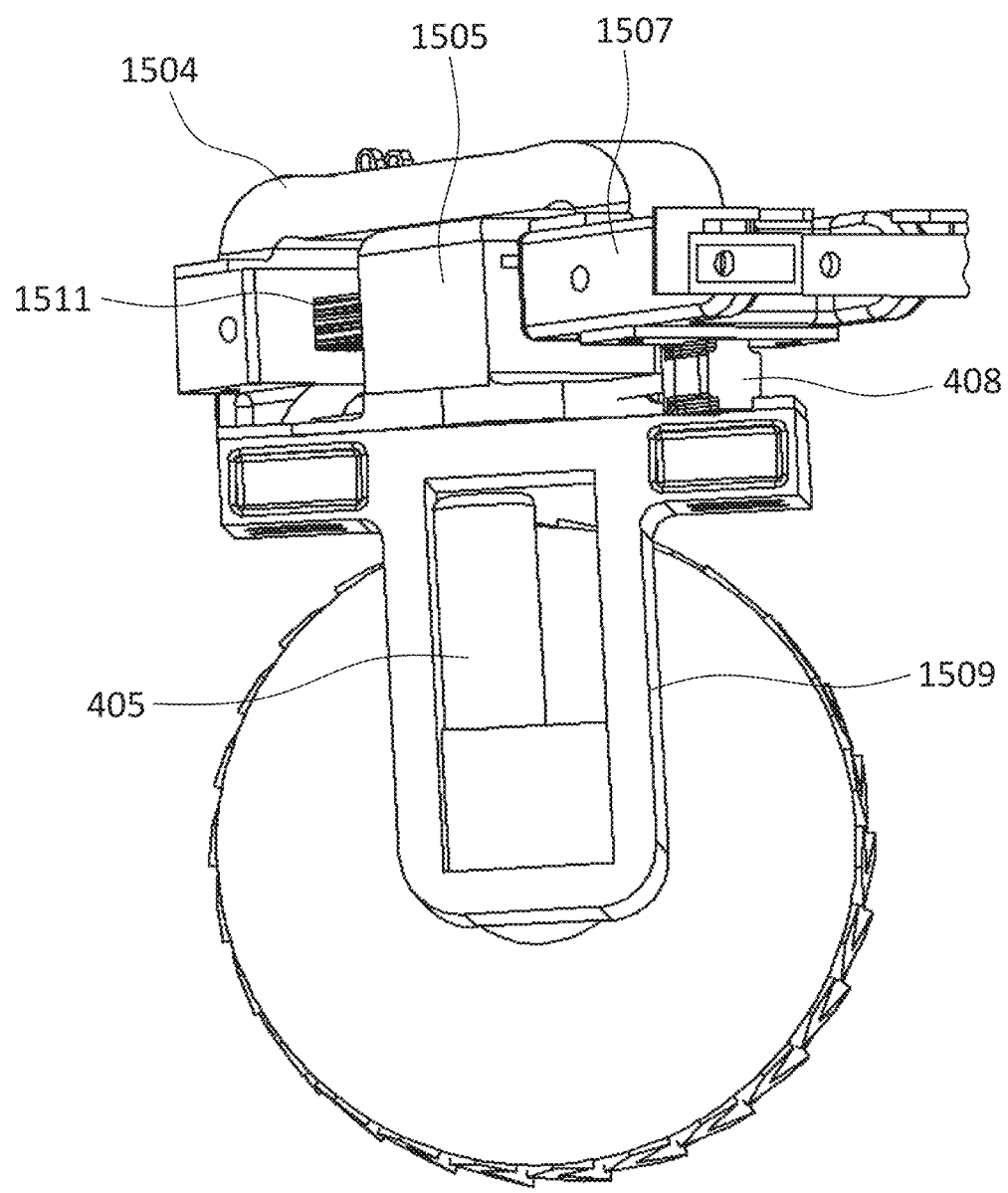
FIG. 18 illustrates a close-up view of the wheel-motor-arm assembly shown in FIG. 15 from the perspective of the inside of the wheel, in accordance with the present disclosure.

FIG. 18 illustrates a close-up view of the wheel assembly shown in FIG. 15 from the perspective of the inside of the wheel. The wheel motor 405 is mounted inside the motor mount 1509 so that the shaft of the motor is directly attached to the wheel hub. The motor mount 1509 is connected to the upper mount and sliding mechanism 1505 such that as the linear actuator motor 408 moves, the rod of the linear actuator pulls or pushes the entire wheel-motor combination in or out along the slotted bar 1511. The upper strut 1504 maintains stiffness as the wheel-motor combination move, connecting to the connecting plate 1507 on the interior end of the wheel-motor assembly.

In an embodiment of the disclosed subject matter, a system for executing tasks common to agriculture and real estate property management includes an autonomous ground vehicle, which can have one or more arms attached or no arms at all. If there are arms, they can be connected to an implement or no implement at all and the autonomous ground vehicle can be programmed to execute one or more tasks that are commonly found in agriculture and in similar maintenance of real estate property with characteristics similar to agricultural tasks. The vehicle and its functions are not restricted to specific types of use but rather embody a highly flexible system of operations to carry out those tasks. The vehicle requires selections by a human operator or, in some embodiments, from a predetermined programmed set of selections or instructions from an artificial intelligence (AI) program based on the status and position of the vehicle to define what type of task is to be executed, where it is to be carried out, when it is to be carried out, and which methods are to be used. Using these instructions, which may be communicated to the vehicle using one of several methods ranging from directly plugging in the vehicle to a personal computer, or using wireless communications according to availability and preference of method. As the vehicle carries out a task, it reports to the operator the results of the operations and the location of the vehicle along with any errors. The operator then may view the results of the single execution of a task or the history of operations across time, using a data storage and reporting system available via the public Internet.

The autonomous ground vehicle is composed of four wheels, each with a motor to drive the wheel. The motors are turned and controlled by a central command module that assures the motors move in concert and at the correct speed and direction. The motors are independently moveable such that turning is accomplished by causing the motors to turn at different speeds. The vehicle may be operated in reverse such that if a task requires the arm and implement to be at the rear of the vehicle instead of the normal forward-facing position, the vehicle accomplishes the task by moving in such mode.

The articulated arm has three attachment points, one at the front of the body and two arms may be attached to the body, one on the left side and one on the right side so that the arms in combination present a wider operating option than a single arm only on one side. The end of the arm includes an attachment point where an implement is attached to execute a specific type of task, such as cutting, pushing, or trimming. The arm has a mid-point connection whereby it is attached to the side of the body of the vehicle so that the arm can be extended or not extended laterally away from the body, and by varying that distance, presents a push-pull movement for tasks requiring such action. The arm has a wheel at its midpoint to support the weight of the arm and provides an adjustment for the height at which an implement is located relative to the ground. The arm also has a moveable attachment point at the front of the body so that the height of the arm is adjustable within the limits of the attachment point. The arm's attachment to the side of the body allows it to slide forward or backward so that the arm's movement can be extended outward to a maximum length when the arm is straight in all its parts, providing a continuous arm instead of a bent arm. Likewise, the arm's midpoint can be moved backward so that its lateral extent is restricted.

The vehicle is operated by two batteries or sets of batteries, one for the control of the motors driving the wheels, the arm, and implement. The second battery powers the electronics comprised of the computer processors, internal network, internal sensors, and all other electronics and communications devices. The batteries are removable.

The batteries are rechargeable. The battery or set of batteries for powering the motor, arm and implements is recharged by plugging into an external power source through a fixed port mounted on the side of the vehicle. The secondary battery or set of batteries is recharged by removing it from the vehicle.

The second battery or set of batteries is mounted on a moveable base, the base being moved forward and backward at the direction of a motor controlled by a sensor to maintain balance of the vehicle fore and aft.

A camera system allows the vehicle to detect objects and obstacles in the path of travel as well as to scan for a target at a distance. The camera system includes four cameras, one mounted on each side of the vehicle.

The vehicle uses a combination of a camera and/or LIDAR to locate objects and obstacles, and through artificial intelligence and programmed instructions can use the object's location to move as required. Objects that provide cues to movement, such as augmented reality codes ("AR Codes") that imbed an instruction into a scannable code that when translated by the vision and navigation, provide the vehicle with instructions such as "move forward 50 meters" while executing a task. Alternatively, the vehicle may be instructed to use row detection to move within a field of operation, distinguishing a planted area versus a non-planted area, either with wide areas of plants or narrow rows of plants, and distinguishing the beginning and end of such planted areas. These methods are used in conjunction with designated boundaries of the field of operation predefined by the human operator, using a map overlap and a drawing method to define the allowable area of movement for the vehicle. While moving, the vehicle may encounter obstacles the require the vehicle to turn, modify course, or reverse course, and recalculate a path to move around or away from the obstacle, and then continue on the original course after avoiding the obstacle. In cases where an alternative path is not calculated the vehicle stops and waits for further instruction. In the case of a task requiring movement toward a target, such as a deer at a distance, the camera is used to scan the field of operation, and upon detection of the target, moves toward the target directly through the field of operation or around the perimeter, either by making the decision based on artificial intelligence or by forced instruction by the operator.

The vehicle communicates with the data storage system using simple text messages, i.e. Short Messaging System (SMS). These messages are sent and received by the communications module using available methods, either a cellular telephony network or a satellite messaging network.

The vehicle communicates with satellites and cellular telephony towers using the Global Positioning System (GPS) and Global Navigation Satellite System (GNSS) methods, which provide precise location information to determine the course of travel relative to the field of operation and the programmed task to be executed. Some tasks do not require any communication, e.g., but not limited to, an instruction to move forward 50 meters regardless of position. Other tasks require awareness of the vehicle's location, e.g. movement through a field around the perimeter of the field.

The central Control Program includes the electronics, computing, communications, wiring, programming, and connections to all of the parts of the vehicle.

The vehicle uses additional direct communications using Bluetooth wirelessly when the vehicle is in proximity to the operator, or a wireless local area network connection using WiFi methods, or by directly plugging a cable into the vehicle's port at the rear of the vehicle. These methods provide a potentially faster and more accessible method of communications with the vehicle compared to the satellite or cellular technologies.

The arm is affixed to the body of the vehicle or the vehicle may be operated with no arm. Motors control the movement of the arm as it is articulated in four sections along its length, in addition to a middle section that includes two articulated parts connected to the middle section of the main arm. The arm is physically connected to the body and the connection point includes a power connection and an electronics connection to control the movement of the arm's motors and any implement attached to it. The arm is removable for maintenance and cleaning and for flexibility in carrying out different types of tasks.

The arm can support a weight of up to 50 pounds such that the implement on the end can be of a substantial composition. The attachments to the arm are connected at the end as specific types of implements associated with carrying out a task. The implement itself may require power and a sensor to control its action, and the end of the arm contains a power connection and an electronics connection to communicate with the central control program.

The arm includes a mounting point for a passive wheel that helps to support the weight of the arm and to help with executing a task. The wheel may be attached or removed as determined by the operator.

The movement of the arm and the attachment point along the side of the body allows the arm to be extended away from the body for as much as 30 inches. The flexible attachment at the side of the body allows the arm to be fully extended in a straight length or a restricted length close to the body.

The mid-section of the arm has two articulated sections that provide a push-pull movement.

The power connector for the arm is located on the front of the body, allowing two arms to be mounted, one on the left side of the vehicle and one on the right side of the vehicle.

The mounting point for the arm at the front of the vehicle also includes a sensor connection point so that electronics controlling the movement of the motors within the arm and the motors within the implement attached to the end of the arm. The present disclosure does not preclude and, in fact, encompasses, an attachment method that allows the height of the arm above the ground and its orientation relative to the ground to be changed.

Specific functions performed by the vehicle, the arm, the implement, and instructions programmed in advance and operations defined by the operator, all make up a system to execute a tasks. The vehicle may be instructed to drive along a fence trimming the grass and weeds underneath the fence and along the area close to the fence. The vehicle may be instructed to cut an open field of crops driving through the field. The vehicle may be instructed to move from a starting point to a target at a distance from the starting point using image recognition to locate the target and then moving in a path as determined by the operator or the artificial intelligence of the pre-defined methods. The vehicle may sweep leaves or push vines using a push-pull action on the arm. The vehicle may pull a wagon attached to the arm or push the wagon in the opposite direction. The system is designed to support a wide range of implements and methods of movement in a highly flexible way.

In the instance of a vine turning task the vehicle is programmed to move in the path between two growing areas which is perceived as the area between two rows, traveling the length of the inter-row area, seeking a vine of a plant such as a pumpkin, squash, or watermelon plant, which extends into the path of the vehicle and outside the growing area. As the vehicle recognizes a vine in its path, it uses the arm to push the vine away from the vehicle by grasping the vine or simply by coming in contact with the vine at the same time as the arm moves laterally away from the body of the vehicle as it travels forward. The motion of the arm and the vehicle cause the vine to be moved out of the path of travel and back into the perceived growing area. The result is that the vines will be moved back into the growing area which results in any fruit that may be attached to the vine will be saved from being later crushed by a vehicle driving into the field of operation for harvesting or tending to the crop. Research indicates that this vine turning process prevents fruit from being damaging, enhancing the total yield of the field.

In the instance of reducing crop damage the vehicle uses image recognition for deer specifically as the target. The vehicle waits at a starting location and periodically scans the field of operation to detect the target. The camera system allows the vehicle to detect a target up to 400 feet away. The movement of the vehicle uses its movement as a threat rather than requiring any other sound or visual methods to represent a predator. The movement of the vehicle in executing this task vary from slow to fast which have been determined in field testing to create an adequate threat and cause the deer to leave the field of operation. In observation during field testing, it is obvious that the target will reappear in a different location, and so the vehicle stops when the target leaves the visible area and waits for a specified time before rescanning the field of operation. By continuing to harass the target, the deer are discouraged from eating the crop and therefore crop damage is reduced. Early protection during the initial growing period is critical, and as a practical matter a ground vehicle will not see the target once the crop is taller than the vehicle. The vehicle can be directed to use the perimeter-only navigation method while scanning rather than attempting to move through a field where rows cannot be distinguished and the crop is taller than the vehicle can see. Any damage to the crop at this point in the crop's life is less critical.

In the instance of cutting a crop of grains such as wheat, buckwheat, or grasses such as hay, the vehicle is programmed to move into a field of operation starting at a point at the perimeter of the field, then proceed forward without regard to any defined rows but rather by identifying the first path to be cut starting from the perimeter of the field, then progressing in a boustrophedonic manner recognizing the cut area from the uncut area. This cutting action requires an implement and arm to be configured on the vehicle whereby a cutting bar is attached to each arm, either on one side of the vehicle or both sides, providing a wide or less wide cutting result. The implement uses a typical oscillation cutting bar to cut the crop, which falls as it is cut in the field to be later harvested or collected, either after drying naturally where fallen or not. The vehicle when reaching the perimeter of the field of operation and no more uncut area is recognized, the vehicle returns to the starting point and executes the next step in navigation, such as returning to a home base.

In the instance of sweeping a cut crop the vehicle moves into a field of operation beginning with a designated starting point at the perimeter of the field, with an implement attached to the arm commonly known as a windrow rake. The rake requires no power and is simply pulled through the field. The rake may be attached to one arm or a rake to each of two arms on either side of the vehicle, providing a smaller or larger sweeping motion. The result is that the previously cut crop is swept into windrows to facilitate gathering and in the case of hay, forming into bales, or in the case of a grain crop to separate the grain from the stalk using another method.

Autonomous ground vehicles may be of variable size by which larger arms and heavier weights may be carried above 50 pounds. Longer arms may extend the reach of the arm beyond 30 inches.

Autonomous ground vehicles have an adjustable wheel assembly connected to the body such that the wheels can be moved to increase or decrease the distance between the bottom of the body and the ground (ground clearance,) and to increase or decrease the space between the wheels. By varying the space between the wheels, the operator can adjust the distance between the wheels to accommodate various crop planting spaces, so that when the vehicle drives in a row-wise navigation pattern, the vehicle does not drive over the planted crops. Marks are provided in the form of "stops" that assist the operator in positioning the wheel width to fit commonly used row widths, e.g. corn is commonly planted in 30 inch rows in the US whereas soybeans are commonly planted in 15 inch rows. By varying the angle of attachment between the wheel assembly and the body, the ground clearance can be changed. This action provides two results: (i) when both sides are moved together, the stability of the vehicle is improved (e.g. when a heavier implement is attached) and (ii) when only one side is moved, the vehicle can be driven along a slanted ground, providing more stability to the vehicle.

In an embodiment of the disclosed subject matter, an autonomous ground vehicle can be driven through a field of crops planted in rows with variable spacing without damaging the crop as long as the wheels are positioned to drive in between the rows. By using preset widths, the operator can pre-program for corn set at 30 inch rows, or soybeans set at 15 inch rows, or lettuce set at 10 inch rows. As the vehicle navigates through a field, it can dynamically change the width since rows might not be precisely the same throughout the field. But by starting with pre-set wheel width, the vehicle requires less changes during the movement in the field. Thus the vehicle can navigate within a field of planted crops without causing undue crop loss caused by trampling the plants.

In an embodiment of the disclosed subject matter, an autonomous ground vehicle adjusts its internal balance by moving the batteries forward and backward within the cavity of the vehicle's body. Moving the battery or battery container, the vehicle can use its balance sensor to keep the vehicle in balance. As an example, it cutting heavy grass, the vehicle can easily get bogged down by wet or tall grass which will cause the vehicle to tip forward on the axis of the front wheels. By sensing such a condition, the batteries would be caused to move backward within the body until the balance sensor detects a level condition. Likewise, a heavy wagon being towed behind the vehicle might bog down and cause the vehicle to tip backward on the rear wheels' axis. The movement uses the simple principle of a Class 1 lever, taking advantage of the length of the vehicle relative to the distance from the implement to the center of the wheels.

In an embodiment of the disclosed subject matter, a system for executing tasks common to agriculture and real estate property management, includes: an autonomous ground vehicle including a body portion connected to a drive portion, a control portion, a power portion, and a visual portion; one or more articulated arms affixed to the body portion of the autonomous ground vehicle; an implement affixed to the end of at least one of the one or more articulated arms; a computerized control module connected to and in communication with the autonomous ground vehicle and including programming to execute movement of the one or more articulated arms, the implement and the autonomous ground vehicle; and a data storage system to record the operations of the system.

In an embodiment of the disclosed subject matter, a method of using the system of paragraph 0081 for fence trimming and monitoring includes: navigating longitudinally along a fence to trim grass and weeds underneath the fence and a short distance beside the fence; monitor the condition of the fence compared to a baseline condition to detect breaks in the fence; and includes software to detect the fence, navigate to the next fence post, turn as directed, control the speed of the vehicle, and control the cutting action.

In an embodiment of the disclosed subject matter, a method of using the system of paragraph 0081 for vine turning includes: using software to control the vehicle as it navigates through a field of vining crops, senses the vines as objects in the non-growing area, and pushes the vines away from the vehicle and back into a pre-designated growing area.

In an embodiment of the disclosed subject matter, a method of using the system of paragraph 0081 for crop damage reduction by harassing deer in a field of crops including: controlling the autonomous ground vehicle using software to survey a field of operation, detecting a deer using image and pattern recognition at a distance of up to 400 feet in daylight, and then pursuing the deer using one of two methods to navigate through a field by either recognizing the planted crops in rows or around the perimeter of the field of operation to move to the deer, as the deer changes position, the vehicle adjusts its path to find the shortest path to the deer's new position, and then by moving rapidly, then slowly, then rapidly the vehicle appears as a harassing object to the deer that does not require the use of sound or noise to cause the deer to flee the area. Of course, alternative embodiments of this method can be applied to all types of animals that damage crops, for example, but not limited to, rodents, rabbits, birds, livestock, and the like.

In an embodiment of the disclosed subject matter, a system of specifying navigation in sequential steps each with a selected navigation method by which the operator defines and the vehicle is directed to use one or more steps to move from a starting location to an end location using methods which are: ad hoc, row-wise movement, longitudinal movement, target acquisition movement, or manual operation In an embodiment of the disclosed subject matter, a system for executing tasks common to agriculture and real estate property management, including: an autonomous ground vehicle including a body portion connected to a drive portion, a control portion, and a visual portion; one or more articulated arms affixed to the body portion of the autonomous ground vehicle; a computerized control module connected to and in communication with the autonomous ground vehicle and including programming to execute movement of the one or more articulated arms, the implement and the autonomous ground vehicle; and a data storage system to record the operations of the system.

In an embodiment of the disclosed subject matter, a system for executing tasks common to agriculture and real estate property management, including: an autonomous ground vehicle including a body portion connected to a drive portion, a control portion, a power portion, and a visual portion; one or more articulated arms affixed to the body portion; an implement affixed to an end of at least one of the one or more articulated arms; a computerized control module connected to and in communication with the autonomous ground vehicle and including executable program code, which when executed by a processor, controls movement of the one or more articulated arms, the implement and the autonomous ground vehicle; and a data storage system in communication with the autonomous ground vehicle to record the operations of the system.

In an embodiment of the disclosed subject matter, a method of using the system of claim 1 comprising: navigating longitudinally along a fence to trim grass and weeds underneath the fence and a short distance beside the fence; monitoring the condition of the fence compared to a baseline condition of the fence to detect breaks in the fence; and detecting the fence, navigating to a next fence post in the fence, turn as directed, control the speed of the vehicle, and control the cutting action.

In an embodiment of the disclosed subject matter, a method of using the system of claim 1 including: navigating longitudinally along a fence to trim grass and weeds underneath the fence and a short distance beside the fence; monitoring the condition of the fence compared to a baseline condition of the fence to detect breaks in the fence; and detecting the fence, navigating to a next fence post in the fence, turn as directed, control the speed of the vehicle, and control the cutting action.

In an embodiment of the disclosed subject matter, a method of using the system of claim 1 includes: using software to control the autonomous ground vehicle to navigate through a field of vining crops; sense the vines as objects in the non-growing area; and push the vines away from the vehicle and back into a pre-designated growing area.

In an embodiment of the disclosed subject matter, a method of using the system of claim 1 including: controlling the autonomous ground vehicle using software to survey a field of operation; detecting a deer in a first position using image and pattern recognition; moving the autonomous ground vehicle toward the first position through the field of operation by either recognizing and moving between planted crops in rows to and then along a perimeter of the field of operation toward the deer, or in a direct line through the field of operation to the first position; and detecting whether the deer has moved to a new position, and, if the deer has moved to the new position, adjusting the path of the autonomous ground vehicle to a shortest path to the new position; wherein the moving of the autonomous ground vehicle occurs rapidly, then slowly, then rapidly.

In an embodiment of the disclosed subject matter, a method of using the system of claim 1 including: using a push-pull motion of the articulate arm in combination with an ordinary yard rake attached to an end of the articulated arm, moving the autonomous ground vehicle in a predefined path to sweep fallen leaves into rows of piles.

In an embodiment of the disclosed subject matter, a system for executing tasks common to agriculture and real estate property management, including: an autonomous ground vehicle including a body portion connected to a drive portion, a control portion, a navigation portion, a visual portion, and one or more articulated arms affixed to the body portion; the control portion including a computerized control module including a processor connected to and in communication with the drive portion, the navigation portion, and the visual portion and the computerized control module including programming, which when executed by the processor, controls movement of the one or more articulated arms and the autonomous ground vehicle; and a data storage system in communication with the control portion to record operations of the system.

While the disclosed subject matter has been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the disclosed subject matter described herein.

What is claimed is:

1. A system for executing tasks common to agriculture and real estate property management, comprising:
    an autonomous ground vehicle including a body portion connected to a drive portion, a control portion, a power portion, and a visual portion;
    one or more articulated arms affixed to the body portion;
    an implement affixed to an end of at least one of the one or more articulated arms;
    a computerized control module contained in the control portion and connected to and in communication with the autonomous ground vehicle and including executable program code, which when executed by a processor, controls movement of the one or more articulated arms, the affixed implement, an up and down movement of a linear actuator, an upper strut and a sliding bar that are connected to a wheel and move relative to a connecting plate that is connected to the drive portion, the drive portion including at least two pairs of wheels with each wheel having a motor, controlled by a master controller for speed and movement, and each master controller is connected to and in communication with the computerized control module, each of the wheels being attached to the body portion in an adjustable manner such that space between each pair of wheels can be varied both laterally and longitudinally while the autonomous ground vehicle is in motion, and movement of the autonomous ground vehicle; and
    a data storage system in communication with the autonomous ground vehicle to record operations of the system.

2. The system of claim 1 wherein the drive portion of the autonomous ground vehicle has a plurality of attachment points configured for connection to at least one of the one or more articulated arms.

3. The system of claim 1 wherein the power portion comprises one or more batteries.

4. The system of claim 3 wherein the batteries are rechargeable batteries.

5. The system of claim 3 wherein the batteries are mounted on a movable frame controlled by another motor where the movable frame moves according to output from a balance sensor to maintain front-to-back balance and provide more stability to the vehicle.

6. The system of claim 1 wherein the visual portion comprises a vision system and a navigation system, which are each connected to and in communication with the computerized control module, wherein the navigation system is configured for navigation control using data from one or more cameras in the vision system.

7. The system of claim 6 wherein the navigation system further comprises a global positioning system (GPS) and a global navigation satellite system (GNSS) connected to and in communication with the computerized control module wherein the navigation system is configured to determine the autonomous ground vehicle's position and location using the GPS and the GNSS.

8. The system of claim 1 wherein the visual portion is configured to detect objects and obstacles and comprises a camera and a Light Detection and Ranging (LIDAR) sensor, and the camera and the LIDAR sensor are connected to and in communication with the computerized control module.

9. The system of claim 1 wherein the system is configured for communication with an operator using a short message service (SMS) messaging service to report operations, error conditions, and status.

10. The system of claim 1 wherein the data storage system comprises an executable software program and associated website and database configured to control the setup and operating parameters for the functions of the system, including standard functions such as hours of operation and days of week allowed, a map to define the boundaries of an area of operation, a method of navigation in one or more steps, the implement affixed and the task to be executed, and where the data storage system records and reports the operations including what attachments and implements are engaged, the results of the task execution and error codes encountered during operations.

11. The system of claim 1 wherein the autonomous ground vehicle is configured to communicate with an operator in close proximity using Bluetooth, WiFi or direct cable attachment.

12. The system of claim 1 wherein each of the one or more articulated arms is configured to be connected to the autonomous ground vehicle either singly or in pairs, with each articulated arm having an attachment point for implements.

13. The system of claim 1 wherein each of the one or more articulated arms is capable of supporting a weight of up to 50 pounds.

14. The system of claim 1 wherein a wheel is attached at a midpoint of each of the one or more articulated arms.

15. The system of claim 1 wherein each of the one or more articulated arms is configured to be moved up or down to an operating height on the body portion based on a size of the body portion to which each of the one or more articulated arms is attached.

16. The system of claim 1 wherein each of the one or more articulated arms is configured to extend out from the autonomous ground vehicle a distance of up to 30 inches laterally when fully extended and retract back to the autonomous ground vehicle.

17. The system of claim 1 wherein a middle attachment point of each of the one or more articulated arms allows each articulated arm to move away from the body portion of the autonomous ground vehicle in a push-pull movement.

18. The system of claim 1 wherein a power connector extends from the power portion to and end of each of the one or more articulated arms.

19. The system of claim 1 wherein a sensor on each of the one or more articulated arms connects to and is in communication with the autonomous ground vehicle to provide two-way communication between each of the one or more articulated arms and the autonomous ground vehicle.

20. The system of claim 1 wherein predetermined functions are performed by a combination of one articulated arm and the implement based on commands from a software program executed in the control portion.

21. A method of using a system comprising:
navigating longitudinally along a fence to trim grass and weeds underneath the fence and a short distance beside the fence;
monitoring a condition of the fence compared to a baseline condition of the fence to detect breaks in the fence; and
detecting the fence, navigating to a next fence post in the fence, turn as directed, control a speed of a vehicle, and control a cutting action to trim the grass and weeds;
wherein the system for executing the method comprises:
an autonomous ground vehicle including a body portion connected to a drive portion, a control portion, a power portion, and a visual portion;
one or more articulated arms affixed to the body portion;
an implement affixed to an end of at least one of the one or more articulated arms;
a computerized control module contained in the control portion and connected to and in communication with the autonomous ground vehicle and including executable program code, which when executed by a processor, controls movement of the one or more articulated arms, the affixed implement, an up and down movement of a linear actuator, an upper strut and a sliding bar that are connected to a wheel and move relative to a connecting plate that is connected to the drive portion, and movement of the autonomous ground vehicle; and
a data storage system in communication with the autonomous ground vehicle to record operations of the system.

22. A method of using the system of claim 1 comprises: using software to control the autonomous ground vehicle to navigate through a field of vining crops; sense the vines as objects in a non-growing area; and push the vines away from the vehicle and back into a pre-designated growing area.

23. A method of using a system comprising: controlling an autonomous ground vehicle using software to survey a field of operation; detecting a deer in a first position using image and pattern recognition; moving the autonomous ground vehicle toward the first position through the field of operation by either recognizing and moving between planted crops in rows to and then along a perimeter of the field of operation toward the deer, or in a direct line through the field of operation to the first position; and detecting whether the deer has moved to a new position, and, if the deer has moved to the new position, adjusting a path of the autonomous ground vehicle to a shortest path to the new position; wherein the moving of the autonomous ground vehicle toward the deer, then stops, then toward the deer; wherein the system for executing the method comprises:
an autonomous ground vehicle including a body portion connected to a drive portion, a control portion, a power portion, and a visual portion;
one or more articulated arms affixed to the body portion;
an implement affixed to an end of at least one of the one or more articulated arms;
a computerized control module contained in the control portion and connected to and in communication with the autonomous ground vehicle and including executable program code, which when executed by a processor, controls movement of the one or more articulated arms, the affixed implement, an up and down movement of a linear actuator, an upper strut and a sliding bar that are connected to a wheel and move relative to a connecting plate that is connected to the drive portion, and movement of the autonomous ground vehicle; and
a data storage system in communication with the autonomous ground vehicle to record operations of the system.

24. The method of claim 23 where the detecting the deer in the first position using image and pattern recognition further comprises detecting the deer at a distance of up to 400 feet in daylight.

25. The method of claim 23 wherein an arm attached to the autonomous ground vehicle is extended and/or moved.

26. A method of using the system of claim 1 comprising: using a push-pull motion of the one or more articulated arms in combination with an ordinary yard rake attached to an end of the articulated arm, moving the autonomous ground vehicle in a predefined path to sweep fallen leaves into rows of piles.

27. A system for executing tasks common to agriculture and real estate property management, comprising:
an autonomous ground vehicle including a body portion connected to a drive portion, a control portion, a navigation portion, a visual portion, and
one or more articulated arms affixed to the body portion;
the control portion including a computerized control module including a processor connected to and in communication with the drive portion, the navigation portion, and the visual portion and the computerized control module including programming, which when executed by the processor, controls movement of the one or more articulated arms, an up and down movement of a linear actuator, an upper strut and a sliding bar that are connected to a wheel and move relative to a connecting plate that is connected to the drive portion, the drive portion including at least two pairs of wheels with each wheel having a motor, controlled by a master controller for speed and movement, and each master controller is connected to and in communication with the computerized control module, each of the wheels being attached to the body portion in an adjustable manner such that space between each pair of wheels can be varied both laterally and longitudinally while the autonomous ground vehicle is in motion, and movement of the autonomous ground vehicle; and
a data storage system in communication with the control portion to record operations of the system.

28. The system of claim 27 further comprising:
an implement affixed to a distal end of at least one of the one or more articulated arms.

29. The system of claim 28 wherein the implement comprises at least one of: a mechanical hand, a gripper device, a trimmer, a rake, and a cutter bar.

* * * * *